US006610788B1

United States Patent
Takakura et al.

(10) Patent No.: US 6,610,788 B1
(45) Date of Patent: Aug. 26, 2003

(54) AQUEOUS DISPERSION OF FLUOROCOPOLYMER AND COMPOSITION FOR WATER-BASED COATING MATERIAL

(75) Inventors: Teruo Takakura, Ichihara (JP); Toru Ishida, Ichihara (JP); Naomi Ichikuni, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/763,148

(22) PCT Filed: Aug. 20, 1999

(86) PCT No.: PCT/JP99/04493

§ 371 (c)(1),
(2), (4) Date: Feb. 20, 2001

(87) PCT Pub. No.: WO00/11094

PCT Pub. Date: Mar. 2, 2000

(30) Foreign Application Priority Data

Aug. 20, 1998 (JP) .............................................. 10-249058

(51) Int. Cl.$^7$ ...................... C08F 259/08; C08F 214/20; C08F 214/26

(52) U.S. Cl. ........................ 525/276; 525/26; 526/250; 526/255; 526/348.6

(58) Field of Search ........................... 525/72, 276, 260, 525/263, 264, 273, 323, 312; 526/250, 256, 348.6

(56) References Cited

U.S. PATENT DOCUMENTS

| | | | | | |
|---|---|---|---|---|---|
| 3,933,773 | A | * | 1/1976 | Foerster | ........................ 525/199 |
| 4,469,846 | A | * | 9/1984 | Khan et al. | ..................... 525/72 |
| 5,284,920 | A | * | 2/1994 | Carlson | ........................ 525/276 |

FOREIGN PATENT DOCUMENTS

| | | |
|---|---|---|
| JP | 51-66321 | 6/1976 |
| JP | 58-217543 | 12/1983 |
| JP | 6-25595 | 2/1994 |
| JP | 6-41490 | 2/1994 |
| JP | 6-322053 | 11/1994 |
| JP | 7-268035 | 10/1995 |

* cited by examiner

Primary Examiner—Robert D. Harlan
(74) Attorney, Agent, or Firm—Oblon, Spivak, McClelland, Maier & Neustadt, P.C.

(57) ABSTRACT

An aqueous dispersion of a fluorocopolymer, which is excellent in stability and film-forming properties as an aqueous dispersion and which gives a coating film excellent in weather resistance and mechanical strength and improved in water resistance and stain resistance. The aqueous dispersion comprises water and dispersed therein a fluorocopolymer which comprises (a) polymer units based on a fluoroolefin, (b) polymer units based on propylene, (c) polymer units based on ethylene and/or (d) polymer units based on butylene and which has a melting point within a range of from 40 to 150° C.

44 Claims, No Drawings

AQUEOUS DISPERSION OF FLUOROCOPOLYMER AND COMPOSITION FOR WATER-BASED COATING MATERIAL

TECHNICAL FIELD

The present invention relates to an aqueous dispersion of a fluorocopolymer and a composition for water-based coating material.

BACKGROUND ART

Heretofore, a vinylidene fluoride type resin is widely used as a baking-type coating material, since it is excellent in weather resistance, heat resistance and chemical resistance and it is soluble in a solvent at a high temperature. As such a vinylidene fluoride type resin, a homopolymer of vinylidene fluoride or a copolymer of vinylidene fluoride with a fluoroolefin (such as tetrafluoroethylene, hexafluoropropylene or chlorotrifluoroethylene), has been proposed. Further, it is known that a copolymer of a fluoroolefin with cyclohexyl vinyl ether and other various monomers, is soluble in an organic solvent even at room temperature, and when used as a coating material, it gives a coating film which is transparent and has high gloss and which further has excellent characteristics such as high weather resistance, water and oil repellency, stain resistance and non-tackiness (JP-A-55-44083), and its use is increasing in the field of weather resistant coating materials for interior and exterior of e.g. buildings.

On the other hand, in recent years, restriction on use of problematic organic solvents has been increased from the viewpoint of the environmental protection against e.g. air pollution or the safety to human bodies, and social demand for an aqueous coating material or a powder coating material employing no organic solvent, has increased. Also with respect to a fluororesin, an aqueous dispersion type has been studied, and with respect to a vinylidene fluoride type resin, a method for emulsion polymerization of an acrylic monomer in the presence of vinylidene fluoride resin particles, has been proposed (JP-A-3-8884, JP-A-4-325509).

Further, also with respect to a copolymer of a fluoroolefin with a cyclohexyl vinyl ether and other various monomers, an aqueous dispersion type has been studied, and it has been reported that such can be prepared by emulsion polymerization (JP-A-57-34107, JP-A-61-231044). Further, an aqueous dispersion has been proposed in which a fluorine-containing copolymer having, as an essential constituting component, polymer units based on a macro monomer having a hydrophilic moiety, is dispersed in water. This aqueous dispersion is excellent in the film-forming properties and presents a coating film having good mechanical strength, and it is reported further that it can be produced even without using an emulsifier or a hydrophilic organic solvent.

However, with an aqueous dispersion of a vinylidene fluoride type resin, the stability of the aqueous dispersion is not necessarily good, and the transparency of the coating film is poor due to the crystallizability of the resin, and if the crystallizability is lowered in an attempt to improve the transparency, there has been a problem that the glass transition temperature of the coating film tends to be so low that the stain resistance tends to deteriorate. By seed polymerization of an acrylic monomer, there has been some improvement over the problems, but such has not been adequate. Further, there has been a problem also with respect to the film-forming properties. Furthermore, the vinylidene fluoride type resin is composed solely of a fluoroolefin, and the cost tends to be high. A copolymer of a fluoroolefin with cyclohexyl vinyl ether and other various monomers is practically useful as the transparency of the coating film and the film-forming properties are good, but since a liquid monomer is employed, the coating film tends to be slightly tacky, and a further improvement in this respect, has been desired.

The present inventors have found that these problems can be solved by an aqueous dispersion obtained by seed polymerization of an acrylic monomer in the presence of particles of a copolymer of a fluoroolefin with an $\alpha$-olefin such as ethylene or propylene. Such an aqueous dispersion has a practical level of adhesion to various substrates, but the adhesion to a glass or cement substrate has not yet been fully satisfactory. Further, contaminants are likely to deposit thereon, and when it is used at a place where no rain will fall thereon, the surface deterioration of the coating film will be little due to high weather resistance, and as compared with a coating film which is susceptible to surface deterioration, a stain once deposited, tends to be scarcely removed by a slight force of rain water. Accordingly, there has been a problem that as compared with a coating film which is susceptible to surface deterioration due to inadequate weather resistance, it is susceptible to staining on appearance. Further, under severe weather conditions, as a non-crosslinked type coating material, blistering or peeling of the coating film is likely to result due to rain or sunshine outdoors, and further, there has been a problem that the solvent resistance is inadequate.

DISCLOSURE OF THE INVENTION

The present invention is to solve the above described problems of the prior art and has an object to present an aqueous dispersion of a fluorocopolymer and a composition for water-based coating material, whereby the aqueous dispersion is excellent in stability and film-forming properties, and the fluorocopolymer coating film is excellent in mechanical strength and improved in weather resistance, water resistance, solvent resistance, adhesion and stain resistance.

The present invention has been made to solve the above described problems, and according to the present invention, the following inventions are presented.

(1)

An aqueous dispersion characterized in that a fluorocopolymer which is a copolymer comprising (a) polymer units based on a fluoroolefin, (b) polymer units based on propylene, and (c) polymer units based on ethylene and/or (d) polymer units based on butylene and which has a melting point within a range of from 40 to 150° C., is dispersed in water.

(2)

An aqueous dispersion characterized in that a fluorocopolymer which is the fluorocopolymer as defined in (1) and which has a glass transition temperature within a range of from −20° C. to +80° C., is dispersed in water.

(3)

An aqueous dispersion characterized in that a fluorocopolymer which is the fluorocopolymer as defined in (1) and which has a value Q as an index of its molecular weight within a range of from 0.1 to 10,000, is dispersed in water, provided that the value Q is a value defined by a volume extruded in a unit time (mm$^3$/sec), when, using a flow tester, the fluorocopolymer is filled in a cylinder having an inner diameter of 11.3 mm and then extruded from a nozzle having an inner diameter of 2.1 mm and a length of 8 mm under a load of 7 kg at 140° C.

(4)

An aqueous dispersion characterized in that a fluorocopolymer which is the fluorocopolymer as defined in (1) and which has a content of fluorine atoms within a range of from 20 to 65 wt %, is dispersed in water.

(5)

An aqueous dispersion characterized in that a fluorocopolymer which is the fluorocopolymer as defined in (1) and which has a particle size within a range of from 50 nm to 300 nm, is dispersed in water.

(6)

An aqueous dispersion obtained by emulsion polymerization, in the presence of 100 parts by weight of particles of the fluorocopolymer as defined in any one of (1) to (5), of from 100 to 10,000 parts by weight of a mixture of the same combination of monomers as for said particles.

(7)

An aqueous dispersion characterized in that composite particles obtained by emulsion polymerization of from 5 to 200 parts by weight of a radical polymerizable monomer mixture comprising, as the main component, an alkyl (meth) acrylate having a $C_{1-18}$ alkyl group, in the presence of 100 parts by weight of particles of the fluorocopolymer as defined in any one of (1) to (6), are dispersed in water.

(8)

A composition for water-based coating material, comprising the aqueous dispersion of the fluorocopolymer as defined in any one of (1) to (6) and from 0.1 to 100 parts by weight, per 100 parts by weight of the solid content of the fluorocopolymer, of the solid content of an inorganic/organic silicon compound, incorporated to the aqueous dispersion.

(9)

A composition for water-based coating material, comprising the aqueous dispersion as defined in (7) and from 0.1 to 100 parts by weight, per 100 parts by weight of the solid content of the composite particles, of the solid content of an inorganic/organic silicon compound, incorporated to the aqueous dispersion.

(10)

A composition for water-based coating material, comprising the aqueous dispersion as defined in (7) and a hydrazine derivative having at least two hydrazine residues, incorporated to the aqueous dispersion.

(11) An aqueous dispersion characterized in that a fluorocopolymer which is a copolymer comprising (a) polymer units based on a fluoroolefin, (b) polymer units based on propylene, (c) polymer units based on ethylene and/or (d) polymer units based on butylene, and (e) polymer units based on at least one member selected from a vinyl ester, a vinyl ether, an isopropenyl ether and an allyl ether and which has a melting point within a range of from 40 to 150° C., is dispersed in water.

(12)

An aqueous dispersion characterized in that a fluorocopolymer which is the fluorocopolymer as defined in (11) and which has a glass transition temperature within a range of from −20° C. to +80° C., is dispersed in water.

(13)

An aqueous dispersion characterized in that a fluorocopolymer which is the fluorocopolymer as defined in (11) and which has a value Q as an index of its molecular weight within a range of from 0.1 to 10,000, is dispersed in water, provided that the value Q is a value defined by a volume extruded in a unit time ($mm^3$/sec), when, using a flow tester, the fluorocopolymer is filled in a cylinder having an inner diameter of 11.3 mm and then extruded from a nozzle having an inner diameter of 2.1 mm and a length of 8 mm under a load of 7 kg at 140° C.

(14)

An aqueous dispersion characterized in that a fluorocopolymer which is the fluorocopolymer as defined in (11) and which has a particle size within a range of from 50 nm to 300 nm, is dispersed in water.

(15)

An aqueous dispersion characterized in that a fluorocopolymer which is the fluorocopolymer as defined in (11) and which has a content of fluorine atoms within a range of from 20 to 65 wt %, is dispersed in water.

(16)

An aqueous dispersion obtained by emulsion polymerization, in the presence of 100 parts by weight of particles of the fluorocopolymer as defined in any one of (11) to (15), of from 100 to 10,000 parts by weight of a mixture of the same combination of monomers as for said particles.

(17)

An aqueous dispersion characterized in that composite particles obtained by emulsion polymerization of from 5 to 200 parts by weight of a radical polymerizable monomer mixture comprising, as the main component, an alkyl (meth) acrylate having a $C_{1-18}$ alkyl group, in the presence of 100 parts by weight of particles of the fluorocopolymer as defined in any one of (11) to (16), are dispersed in water.

(18)

A composition for water-based coating material, comprising the aqueous dispersion of the fluorocopolymer as defined in any one of (11) to (16) and from 0.1 to 100 parts by weight, per 100 parts by weight of the solid content of the fluorocopolymer, of the solid content of an inorganic/organic silicon compound, incorporated to the aqueous dispersion.

(19)

A composition for water-based coating material, comprising the aqueous dispersion as defined in (17) and from 0.1 to 100 parts by weight, per 100 parts by weight of the solid content of the composite particles, of the solid content of an inorganic/organic silicon compound, incorporated to the aqueous dispersion.

(20)

A composition for water-based coating material, comprising the aqueous dispersion as defined in (17) and a hydrazine derivative having at least two hydrazine residues, incorporated to the aqueous dispersion.

(21)

An aqueous dispersion characterized in that a fluorocopolymer which is a copolymer comprising (a) polymer units based on a fluoroolefin, (b) polymer units based on propylene, (c) polymer units based on ethylene and/or (d) polymer units based on butylene, and (f) polymer units based on a hydrophilic macro monomer represented by the general formula: X-Y-Z (wherein X is a radical polymerizable unsaturated group, Y is a hydrophobic bivalent connecting group, and Z is a hydrophilic group) and which has a melting point within a range of from 40 to 150° C., is dispersed in water.

(22)

An aqueous dispersion characterized in that a fluorocopolymer which is the fluorocopolymer as defined in (21) and which has a glass transition temperature within a range of from −20° C. to +80° C., is dispersed in water.

(23)

An aqueous dispersion characterized in that a fluorocopolymer which is the fluorocopolymer as defined in (21) and which has a value Q as an index of its molecular weight within a range of from 0.1 to 10,000, is dispersed in water, provided that the value Q is a value defined by a volume extruded in a unit time (mm$^3$/sec), when, using a flow tester, the fluorocopolymer is filled in a cylinder having an inner diameter of 11.3 mm and then extruded from a nozzle having an inner diameter of 2.1 mm and a length of 8 mm under a load of 7 kg at 140° C.

(24)

An aqueous dispersion characterized in that a fluorocopolymer which is the fluorocopolymer as defined in (21) and which has a particle size within a range of from 50 nm to 300 nm, is dispersed in water.

(25)

An aqueous dispersion characterized in that a fluorocopolymer which is the fluorocopolymer as defined in (21) and which has a content of fluorine atoms within a range of from 20 to 65 wt %, is dispersed in water.

(26)

An aqueous dispersion obtained by emulsion polymerization, in the presence of 100 parts by weight of particles of the fluorocopolymer as defined in any one of (21) to (25), of from 100 to 10,000 parts by weight of a mixture of the same combination of monomers as for said particles.

(27)

An aqueous dispersion characterized in that composite particles obtained by emulsion polymerization of from 5 to 200 parts by weight of a radical polymerizable monomer mixture comprising, as the main component, an alkyl (meth) acrylate having a $C_{1-8}$ alkyl group, in the presence of 100 parts by weight of particles of the fluorocopolymer as defined in any one of (21) to (26), are dispersed in water.

(28)

A composition for water-based coating material, comprising the aqueous dispersion of the fluorocopolymer as defined in any one of (21) to (26) and from 0.1 to 100 parts by weight, per 100 parts by weight of the solid content of the fluorocopolymer, of the solid content of an inorganic/organic silicon compound, incorporated to the aqueous dispersion.

(29)

A composition for water-based coating material, comprising the aqueous dispersion as defined in (27) and from 0.1 to 100 parts by weight, per 100 parts by weight of the solid content of the composite particles, of the solid content of an inorganic/organic silicon compound, incorporated to the aqueous dispersion.

(30)

A composition for water-based coating material, comprising the aqueous dispersion as defined in (27) and a hydrazine derivative having at least two hydrazine residues, incorporated to the aqueous dispersion.

(31)

An aqueous dispersion characterized in that a fluorocopolymer which is a copolymer comprising (a) polymer units based on a fluoroolefin, (b) polymer units based on propylene, (c) polymer units based on ethylene and/or (d) polymer units based on butylene, (e) polymer units of at least one member selected from a vinyl ester, a vinyl ether, an isopropenyl ether and an allyl ether, and (f) polymer units based on a hydrophilic macro monomer represented by the general formula: X-Y-Z (wherein X is a radical polymerizable unsaturated group, Y is a hydrophobic bivalent connecting group, and Z is a hydrophilic group) and which has a melting point within a range of from 40 to 150° C., is dispersed in water.

(32)

An aqueous dispersion characterized in that a fluorocopolymer which is the fluorocopolymer as defined in (31) and which has a glass transition temperature within a range of from −20° C. to +80° C., is dispersed in water.

(33)

An aqueous dispersion characterized in that a fluorocopolymer which is the fluorocopolymer as defined in (31) and which has a value Q as an index of its molecular weight within a range of from 0.1 to 10,000, is dispersed in water, provided that the value Q is a value defined by a volume extruded in a unit time (mm$^3$/sec), when, using a flow tester, the fluorocopolymer is filled in a cylinder having an inner diameter of 11.3 mm and then extruded from a nozzle having an inner diameter of 2.1 mm and a length of 8 mm under a load of 7 kg at 140° C.

(34)

An aqueous dispersion characterized in that a fluorocopolymer which is the fluorocopolymer as defined in (31) and which has a particle size within a range of from 50 nm to 300 nm, is dispersed in water.

(35)

An aqueous dispersion characterized in that a fluorocopolymer which is the fluorocopolymer as defined in (31) and which has a content of fluorine atoms within a range of from 20 to 65 wt %, is dispersed in water.

(36)

An aqueous dispersion obtained by emulsion polymerization, in the presence of 100 parts by weight of particles of the fluorocopolymer as defined in any one of (31) to (35), of from 100 to 10,000 parts by weight of a mixture of the same combination of monomers as for said particles.

(37)

An aqueous dispersion characterized in that composite particles obtained by emulsion polymerization of from 5 to 200 parts by weight of a radical polymerizable monomer mixture comprising, as the main component, an alkyl (meth) acrylate having a $C_{1-18}$ alkyl group, in the presence of 100 parts by weight of particles of the fluorocopolymer as defined in any one of (31) to (36), are dispersed in water.

(38)

A composition for water-based coating material, comprising the aqueous dispersion of the fluorocopolymer as defined in any one of (31) to (36) and from 0.1 to 100 parts by weight, per 100 parts by weight of the solid content of the fluorocopolymer, of the solid content of an inorganic/organic silicon compound, incorporated to the aqueous dispersion.

(39)

A composition for water-based coating material, comprising the aqueous dispersion as defined in (37) and from 0.1 to 100 parts by weight, per 100 parts by weight of the solid content of the composite particles, of the solid content of an inorganic/organic silicon compound, incorporated to the aqueous dispersion.

(40)

A composition for water-based coating material, comprising the aqueous dispersion as defined in (37) and a hydrazine derivative having at least two hydrazine residues, incorporated to the aqueous dispersion.

(41)

A composition for water-based coating material, comprising an aqueous dispersion of a fluorocopolymer obtained by emulsion polymerization of from 5 to 100 parts by weight of a radical polymerizable monomer mixture comprising (j) a monomer comprising, as the main component, an alkyl (meth)acrylate having a $C_{1-18}$ alkyl group and (k) a carbonyl group-containing monomer, in the presence of 100 parts by weight of particles of the fluorocopolymer as defined in any one of (1) to (6), and a hydrazine derivative containing at least two hydrazine residues, incorporated to the aqueous dispersion.

(42)

A composition for water-based coating material, comprising an aqueous dispersion of a fluorocopolymer obtained by emulsion polymerization of from 5 to 100 parts by weight of a radical polymerizable monomer mixture comprising (j) a monomer comprising, as the main component, an alkyl (meth)acrylate having a $C_{1-18}$ alkyl group and (k) a carbonyl group-containing monomer, in the presence of 100 parts by weight of particles of the fluorocopolymer as defined in any one of (11) to (16), and a hydrazine derivative containing at least two hydrazine residues, incorporated to the aqueous dispersion.

(43)

A composition for water-based coating material, comprising an aqueous dispersion of a fluorocopolymer obtained by emulsion polymerization of from 5 to 100 parts by weight of a radical polymerizable monomer mixture comprising (j) a monomer comprising, as the main component, an alkyl (meth)acrylate having a $C_{1-18}$ alkyl group and (k) a carbonyl group-containing monomer, in the presence of 100 parts by weight of particles of the fluorocopolymer as defined in any one of (21) to (26), and a hydrazine derivative containing at least two hydrazine residues, incorporated to the aqueous dispersion.

(44)

A composition for water-based coating material, comprising an aqueous dispersion of a fluorocopolymer obtained by emulsion polymerization of from 5 to 100 parts by weight of a radical polymerizable monomer mixture comprising (j) a monomer comprising, as the main component, an alkyl (meth)acrylate having a $C_{1-18}$ alkyl group and (k) a carbonyl group-containing monomer, in the presence of 100 parts by weight of particles of the fluorocopolymer as defined in any one of (31) to (36), and a hydrazine derivative containing at least two hydrazine residues, incorporated to the aqueous dispersion.

BEST MODE FOR CARRYING OUT THE INVENTION

In the present invention, an aqueous dispersion of a fluorocopolymer comprising (a) polymer units based on a fluoroolefin, (b) polymer units based on propylene, as essential components, and further (c) polymer units based on ethylene and/or (d) polymer units based on butylene, is used.

Here, the fluorocopolymer is preferably composed of the following compositional proportions of the polymer units based on the following monomers (hereinafter represented by the monomer names).

| | |
|---|---|
| (a) fluoroolefin | 20 to 80 mol% |
| (b) propylene | 2 to 70 mol% |
| (c) ethylene | (5) to (70) mol% |
| (d) butylene | (5) to (70) mol%. |

The compositional proportions are further preferably:

| | |
|---|---|
| (a) fluoroolefin | 35 to 65 mol% |
| (b) propylene | 4 to 55 mol% |
| (c) ethylene | (8) to (60) mol% |
| (d) butylene | (8) to (60) mol%. |

Most preferably:

| | |
|---|---|
| (a) fluoroolefin | 40 to 60 mol% |
| (b) propylene | 6 to 35 mol% |
| (c) ethylene | (10) to (35) mol% |
| (d) butylene | (10) to (35) mol%. |

Here, the compositional proportions of the polymer units (c) ethylene and (d) butylene are bracketed and represented, for example, as (5), (8) and (10), for the following meanings. Namely, as defined in the Claims, at least one of (c) and (d) is necessarily contained, and the other may not be contained at all, and (5), (8), (10) or the like represents the content of the component (c) or (d) thus contained alone in such a case. Further, when both (c) and (d) are contained, (5), (8), (10) or the like represents the total content of both components.

When the fluorocopolymer of the present invention is employed for a coating material, if the proportion of the fluoroolefin polymer units (a) is to small, the weather resistance tends to be poor, and if it is too large, the cost tends to be high relative to the improvement in weather resistance, such being undesirable. Taking these into consideration, the above range is selected.

Further, if the proportion of the polymer units (b) is too small, the fluorocopolymer tends to be rubbery, and the hardness of the coating film tends to be inadequate, and if it is too large, the melting point tends to be too high, and the flexibility of the coating film tends to be inadequate. Taking these into consideration, the above range is selected.

As mentioned above, the polymer units (c) and (d) may both be used together, or either one may be used. However, it is essential to use at least one of them. If the proportion of (c) and/or (d) is too small, the melting point tends to be too high, and the crystallization of the coating film tends to be high, whereby the transparency tends to decrease. If it is too large, the fluorocopolymer tends to be rubbery, whereby the hardness tends to be inadequate. Taking these into consideration, the above range is selected as preferred.

In the present invention, the fluoroolefin is preferably a $C_{2-4}$ fluoroolefin containing fluorine atoms, such as trifluoroethylene, chlorotrifluoroethylene, tetrafluoroethylene, trifluoropropylene, tetrafluoropropylene, pentafluoropropylene, hexafluoropropylene, tetrafluorobutylene or pentafluorobutylene, particularly preferably a perfluoroolefin. Most preferably, it is tetrafluoroethylene. Further, it may contain, in addition to fluorine atoms, other halogen atoms such as chlorine atoms.

Further, as the butylene in the present invention, 1-butylene, 2-butylene and isobutylene may be used. From the viewpoint of easy availability, isobutylene is most preferred. Further, a mixture of them may be employed.

The range of the melting point of the fluorocopolymer of the present invention is from 40 to 150° C., preferably from 60 to 120° C. If the melting point is too low, the hardness of the coating film tends to be inadequate, and if the melting point is too high, no adequate fluidity is obtainable at the time of heat coating, whereby the appearance of the coating film will be impaired. Whereas, in the case of a vinylidene fluoride type resin, even in the same melting point range, the hardness of the coating film is likely to be inadequate, or the transparency is likely to be low due to high crystallizability.

The range of the glass transition temperature of the fluorocopolymer of the present invention is from −20° C. to +80° C., preferably from 0 to 70° C. If the glass transition temperature is too low, the hardness of the coating film tends to be inadequate, and if it is too high, no adequate fluidity is obtainable at the time of heat coating, whereby the appearance of the coating film will be impaired. Whereas, in the case of a vinylidene fluoride type resin, the glass transition temperature is low, and the hardness of the coating film will be inadequate.

For the melting point and the glass transition temperature, a sample was heated at a rate of 10° C./min by a differential scanning calorimeter (DSC), whereby the heat generation peak was obtained, and the temperature at that time was taken as the melting point. In a case where the distribution of the peak of the melting point was wide, the lowest point of the portion downwardly projected was taken as the melting point.

It is important that the value Q as an index of the molecular weight of the fluorocopolymer of the present invention is within a range of from 0.1 to 10,000, more preferably from 1 to 1,000, still further preferably from 10 to 500.

If the value Q is less than 0.1, the fluidity of particles tends to be low, whereby the film-forming properties and smoothness of the coating film tend to deteriorate. If it is larger than 10,000, the mechanical strength of the coating film tends to be impaired.

The range of the particle size of the fluorocopolymer of the present invention is from 50 nm to 300 nm, preferably from 70 to 200 nm.

Here, the particle size is an average particle size measured by means of a laser beam scattering particle size measuring apparatus (ELS-3000, manufactured by Otsuka Denshi K.K.).

If the particle size is less than 50 nm, the mechanical stability tends to deteriorate, and the film-forming properties also tend to deteriorate. If it exceeds 300 nm, the precipitation stability, the thermal stability, the mechanical stability and the chemical stability tend to be impaired. However, particles having particle sizes other than the above range may be contained if they are less than 10 wt %.

The content of fluorine atoms in the fluorocopolymer of the present invention is within a range of from 20 to 65 wt %, preferably from 30 to 60 wt %. If the content of fluorine atoms is too small, the weather resistance tends to deteriorate, and if it is too large, the adhesion of the coating film to the substrate tends to deteriorate.

The fluorocopolymer of the present invention may be a copolymer containing, in addition to the polymer units based on monomers for the above (a) to (d), (e) polymer units based on at least one monomer selected from a vinyl ester, a vinyl ether, an isopropenyl ether and an allyl ether. If the polymer units based on such a monomer are contained, not only the pigment dispersibility and adhesion to the substrate will be improved, but also affinity to an acrylic monomer will be improved, whereby the transparency and weather resistance of the coating film will be improved.

If the polymer units based on the above-mentioned (e) at least one monomer selected from a vinyl ester, a vinyl ether, an isopropenyl ether and an allyl ether are too much, the coating film tends to be tacky. Further, if they are too little, no adequate effects for improvement in pigment dispersibility, adhesion to the substrate and the affinity to an acrylic monomer, can be obtained.

Accordingly, the content of polymer units based on component (e) is preferably at a level of from 5 to 20 mol %.

The above vinyl ester may, for example, be vinyl acetate, vinyl propionate, vinyl butyrate, vinyl pivalate, vinyl capronate, vinyl caprylate or vinyl stearate. The vinyl ether may, for example, be methyl vinyl ether, ethyl vinyl ether, propyl vinyl ether, butyl vinyl ether or cyclohexyl vinyl ether. The isopropenyl ether may, for example, be methyl isopropenyl ether, ethyl isopropenyl ether, propyl isopropenyl ether, butyl isopropenyl ether or cyclohexyl isopropenyl ether. The allyl ether may, for example, be ethyl allyl ether, propyl allyl ether, butyl allyl ether or isobutyl allyl ether.

Further, the polymer units based on the monomer of the above (e) may contain a reactive group selected from a hydroxyl group, a carboxylic acid group, an epoxy group and a hydrolysable silyl group. The polymer units based on the monomer containing such a reactive group may be incorporated in an amount of at least 20 mol %, preferably at least 25 mol %, in the polymer units based on the monomer of the above (e).

Even when the fluorocopolymer of the present invention has such reactive groups, the stability of the dispersion will not be impaired. And, in a case where the fluorocopolymer has such reactive groups, there is a merit in that by using a curing agent when such aqueous dispersion is used as the base for coating material, it is possible to form a coating film having excellent water resistance and solvent resistance upon crosslinking. In this sense, such reactive groups may be regarded as corresponding to cure sites.

Polymer units containing hydroxyl groups may be introduced by a method of copolymerizing such a hydroxyl group-containing monomer or by a method of forming hydroxyl group-containing units by subjecting the polymer to a high molecular reaction.

Here, the hydroxyl group-containing monomer may, for example, be a hydroxyalkyl vinyl ether such as hydroxybutyl vinyl ether (HBVE); a hydroxyalkyl allyl ether such as hydroxyethyl allyl ether; a hydroxyalkyl ester of acrylic acid or methacrylic acid, such as hydroxyethyl acrylate or hydroxyethyl methacrylate.

Further, the method of forming polymer units containing hydroxyl groups by subjecting a polymer to a high molecular reaction, may, for example, be a method wherein after the polymerization, a hydrolysable vinyl ester is copolymerized, followed by hydrolysis to form hydroxyl groups.

On the other hand, polymer units containing carboxylic acid groups may be introduced by a method of copolymerizing a carboxylic acid group-containing monomer or by a method of forming carboxylic acid groups by reacting a dibasic acid anhydride to a polymer having hydroxyl groups.

Here, the carboxylic acid group-containing monomer may, for example, be as follows.

$$CH_2=CHOR^1COR^2COOM \quad (A)$$

$$CH_2=CHCH_2R^3COR^4COOM \quad (B)$$

(wherein each of $R^1$ and $R^3$ is a $C_{2-15}$ bivalent hydrocarbon group, each of $R^2$ and $R^4$ is a saturated or unsaturated linear or cyclic bivalent hydrocarbon group, and M is a hydrogen atom, a hydrocarbon group, an alkali metal ion or a compound containing a nitrogen atom).

Polymer units containing epoxy groups can be introduced by copolymerizing a monomer containing an epoxy group. The monomer containing an epoxy group may, for example, be an epoxy group-containing alkyl vinyl ether such as glycidyl vinyl ether; an epoxy group-containing alkyl allyl ether such as glycidyl allyl ether; or an epoxy group-containing alkyl acrylate or methacrylate, such as glycidyl acrylate or glycidyl methacrylate.

The polymer units containing hydrolysable silyl groups may be introduced by copolymerizing a monomer containing a hydrolysable silyl group. The monomer containing a hydrolysable silyl group may, for example, be trimethoxy vinyl silane or triethoxy vinyl silane.

In the fluorocopolymer of the present invention, in addition to monomers of the above (a) to (d) or the above (a) to (e), (f) a hydrophilic macro monomer represented by the general formula: X-Y-Z (wherein X is a radical polymerizable unsaturated group, Y is a hydrophobic bivalent connecting group, and Z is a hydrophilic group), may be copolymerized. If the polymer units based on such a hydrophilic macro monomer, are contained, not only the mechanical stability and the chemical stability of the aqueous dispersion will be improved, but also the film-forming properties and the mechanical strength of the coating film will be excellent, and further an emulsifier for stabilization is not totally or substantially required, whereby the water resistance or stain resistance can be improved.

Here, the radical polymerizable unsaturated group X may, for example, be a vinyl group ($CH_2$=CH—), an allyl group ($CH_2$=CHCH$_2$—), a propenyl group ($CH_3$CH=CH—), an isopropenyl group ($CH_2$=C($CH_3$)—), an acryloyl group ($CH_2$=CHCO—) or a methacryloyl group ($CH_2$=C($CH_3$)CO—).

The hydrophobic bivalent connecting group Y may, for example, be preferably a linear or branched hydrocarbon group, a polyoxypropylene group, an alicyclic group such as a cyclohexane ring or a cyclododecane ring, and an aromatic group. The more hydrophobic the connecting group, the higher the compatibility of the hydrophilic macro monomer with other copolymerizable monomer such as ethylene and propylene, whereby the reactivity of the macro monomer will be improved, and consequently, it becomes possible to obtain an aqueous dispersion of a fluorocopolymer excellent in stability even if an emulsifier for stabilization is not totally or substantially used.

The hydrophilic group Z may be ionic, nonionic, amphoteric, or a combination thereof. When it is composed solely of an ionic hydrophilic group, the chemical stability of the aqueous dispersion of the fluorocopolymer tends to decrease, and it is preferred to combine a macro monomer having a nonionic or amphoteric hydrophilic group. From the viewpoint of the intensity of the hydrophilicity or the influence over the coating film properties, a nonionic hydrophilic group such as a polyoxyethylene group or a polyoxypropylene/polyoxyethylene group, is particularly preferred.

The macro monomer is meant for a low molecular weight polymer or an oligomer having a radical polymerizable unsaturated group at one terminal. Namely, it is a compound having a radical polymerizable unsaturated group at one terminal and at least two repeating units in order to obtain adequate stability. Usually, one having at most 100 repeating units, is preferably employed from the viewpoint of the polymerizability and water resistance, although such may vary depending upon the type of the repeating units.

As the hydrophilic macro monomer, one with one terminal being a vinyl ether type or an allyl ether type, is preferred.

For example, it may be:

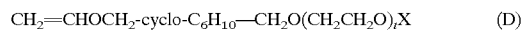

(wherein t is an integer of from 2 to 40, and X is a hydrogen atom, a lower alkyl group or a lower acyl group).

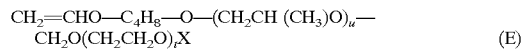

(wherein u is an integer of from 1 to 10, and t and X are as defined above).

(wherein t and X are as defined above).

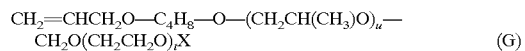

(wherein u, t and X are as defined above).

Further, the connecting moiety of (—cyclo-$C_6H_{10}$—) is 1,4-, 1,3- or 1,2-. However, usually, 1,4- is employed.

Especially one having a vinyl ether type structure at one terminal is preferred since it is excellent in alternate copolymerizability with a fluoroolefin, and the weather resistance of the copolymer coating film will be good. The following may, for example, be mentioned.

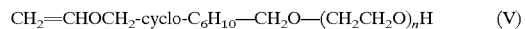

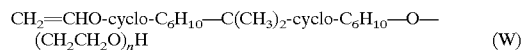

In the above (Q), (V) and (W), n is an integer of from 2 to 40.

Such a hydrophilic macro monomer can be produced by a method of polymerizing formaldehyde to an alkyl allyl ether or an alkyl vinyl ether having a hydroxyl group, or subjecting an alkylene oxide or a compound having a lactone ring to ring opening polymerization. It can also be produced by introducing vinyl ether groups or allyl ether groups to a terminal of a hydrophilic polymer such as polyethylene glycol.

Further, the hydrophilic macro monomer may be a macro monomer which has a chain having a hydrophilic ethylenic unsaturated monomer radical-polymerized and which has a radical polymerizable unsaturated group such as a vinyl ether or an allyl ether at its terminal. Such a macro monomer can be produced, for example, by a method disclosed by Yamashita et al. in Polym. Bull., 5. 335 (1981)). Namely, an ethylenic unsaturated monomer having a hydrophilic group is radical-polymerized in the presence of a chain transfer agent and an initiator having a condensable functional group to produce a polymer having condensable functional groups, and then a compound such as glycidyl vinyl ether or glycidyl allyl ether, is reacted to such functional groups of this polymer, to introduce radical polymerizable unsaturated groups at the terminal.

The ethylenic unsaturated monomer to be used for the production of this hydrophilic macro monomer, may, for example, be acrylamide, methacrylamide, N-methylol acrylamide, N-methylol methacrylamide, 2-methoxyethyl acrylate, 2-methoxyethyl methacrylate, diacetone acrylamide, hydroxyethyl acrylate, hydroxypropyl acrylate, hydroxybutyl acrylate, hydroxyethyl methacrylate, hydroxypropyl methacrylate, hydroxybutyl methacrylate, an acrylate of a polyhydric alcohol, a methacrylate of a polyhydric alcohol, and vinyl pyrrolidone.

Other than these, a monomer copolymerizable with an ethylenic unsaturated monomer may be used together with the ethylenic unsaturated monomer. As such a copolymerizable monomer, acrylamide or its derivative, methacrylamide or its derivative, an N-methylol acrylamide derivative, diethylene glycol monoethyl ether monoacrylate, triethylene glycol monomethyl ether monoacrylate, a phosphate of 2-hydroxyethyl acrylate, or butoxyethyl acrylate, may be mentioned.

Further, the initiator to be used for the production of such a hydrophilic macro monomer, may, for example, be 4,4'-azobis-4-cyanovalerianic acid, 2,2'-azobis-2-amidinopropane hydrochloride, potassium persulfate, ammonium persulfate, azobisisobutyronitrile or benzoyl peroxide.

It is preferred that in the fluorocopolymer of the present invention, the polymer units based on the hydrophilic macro monomer are contained in a proportion of from 0.1 to 25 mol %, preferably from 0.3 to 20 mol %. If the content of the polymer units based on the hydrophilic macro monomer is too small, the mechanical stability and the chemical stability of the aqueous dispersion can not remarkably be improved, and if it is too large, the weather resistance and the water resistance of the coating film tend to be poor, such being undesirable.

The aqueous dispersion of the present invention is one having the fluorocopolymer dispersed in water. Further, the aqueous dispersion of the present invention is excellent in the dispersion stability even if an emulsifier which is commonly employed for an aqueous dispersion of a fluorocopolymer, is not employed. However, use of an emulsifier is not excluded. As the emulsifier, nonionic emulsifiers and anionic emulsifiers may be employed alone or in combination. The nonionic emulsifiers may, for example, be an alkylphenol ethylene oxide adduct, a higher alcohol ethylene oxide adduct, and a block copolymer of ethylene oxide with propylene oxide. The anionic emulsifiers may, for example, be an alkylbenzene sulfonate, an alkylnaphthalene sulfonate, a higher fatty acid salt, an alkylsulfonic acid salt, an alkyl ether sulfonic acid ester salt, a phosphoric acid ester salt.

Further, such an emulsifier is used usually by adding it during polymerization, but an emulsifier of the same type and/or an emulsifier of a different type may be added to the aqueous dispersion after the polymerization.

Here, as the emulsifier to be added to the aqueous dispersion after the polymerization, in addition to the above-mentioned emulsifiers, an alkali metal salt of a dialkyl sulfosuccinic acid such as sodium dioctyl sulfosuccinate or sodium dinonyl sulfosuccinate, and a combination thereof with an alkylene glycol such as ethylene glycol or propylene glycol, may, for example, be mentioned. When such an alkali metal salt of a dialkyl sulfosuccinic acid and an alkylene glycol are added, the mechanical stability and the thermal stability of the above aqueous dispersion can be improved.

Initiation of the emulsion polymerization in the present invention is carried out by addition of a polymerization initiator in the same manner as the initiation of usual emulsion polymerization. As the polymerization initiator, a usual radical initiator may be employed, but a water-soluble initiator is particularly preferably employed. Specifically, a persulfate such as ammonium persulfate, hydrogen peroxide, or a redox initiator composed of a combination thereof with a reducing agent such as sodium hydrogen sulfite or sodium thiosulfate, an inorganic initiator of a system having a small amount of iron, a ferrous salt, silver sulfate or the like incorporated thereto, or an organic initiator such as a dibasic acid peroxide such as disuccinic acid peroxide or diglutaric acid peroxide, azobisisobutylamidine hydrochloride or azobisisobutyronitrile, may, for example, be mentioned.

The amount of the polymerization initiator can be changed optionally depending upon the type and the emulsion polymerization conditions, but it is usually at a level of from 0.005 to 0.5 part by weight, per 100 parts by weight of the monomer to be subjected to emulsion polymerization. Further, such a polymerization initiator may be added all at once or dividedly as the case requires.

Further, a pH controlling agent may be used for the purpose of increasing the pH of the emulsion. As such a pH controlling agent, an inorganic base such as sodium carbonate, potassium carbonate, sodium hydrogen orthophosphate, sodium thiosulfate or sodium tetraborate, or an organic base such as triethylamine, triethanolamine, dimethylethanolamine or diethylethanolamine, may, for example, be mentioned.

The amount of the pH controlling agent is usually at a level of from 0.05 to 2 parts by weight, preferably from 0.1 to 2 parts by weight, per 100 parts by weight of the emulsion polymerization medium. The higher the pH is, the higher the polymerization rate tends to be.

Further, with respect to the initiation temperature for the emulsion polymerization, an optimum value is suitably selected depending upon the type of the polymerization initiator. However, usually, a temperature of from 0 to 100° C., particularly from about 10 to 90° C., is preferably employed. The polymerization temperature is from about 20 to 120° C. Further, the reaction pressure can be optionally selected, but usually, it is preferred to employ a pressure of from 0.1 to 10 MPa, particularly from about 0.2 to 5 MPa.

In such a production method, the additives such as the monomer, water, the emulsifier and the polymerization initiator may be charged all at once for polymerization. However, for the purpose of improving various physical properties such as the stability of the dispersion and the gloss of the coating film by reducing the particle size of dispersed particles, preliminary emulsifying may be carried out by means of a stirrer such as a homogenizer prior to addition of the polymerization initiator, and then the initiator is added for polymerization. Further, various methods may be employed, such as a method of introducing the monomer in its entire amount all at once into the reactor, a method of introducing the entire amount of the monomer continuously, a method of introducing the monomer by dividing its entire amount, and a method of charging a part of the monomer for preliminary reaction and then introducing the rest dividedly or continuously. Further, in the case of divided addition, the monomer composition may be different.

The fluorocopolymer of the present invention may be prepared by emulsion polymerization, in the presence of particles of the fluorocopolymer preliminarily polymerized, of a monomer having the same monomer composition as the particles. By the presence of the copolymer particles in water preliminarily, the gaseous monomer tends to be readily absorbed, whereby the polymerization rate will be improved. Further, at that time, the particles of the preliminarily polymerized fluorocopolymer may be diluted and then the emulsion polymerization is carried out, whereby the stability of the dispersion can further be improved.

In such a case, it is preferred to carry out the polymerization in a ratio of from 100 to 10,000 parts by weight of the monomer mixture, per 100 parts by weight of the particles of the fluorocopolymer preliminarily charged at the time of the polymerization. If the proportion of the particles of the fluorocopolymer preliminarily charged, is too low, the effect for the improvement of the polymerization rate tends to be small, and if it is too high, the yield of an aqueous dispersion obtainable by a single polymerization operation tends to be small, such being not economical.

Further, in order to further improve the absorption of the gas of the monomer, a hydrophilic organic compound, such as an alcohol such as methanol, ethanol, isopropanol, n-butanol, isobutanol or t-butanol; or an alkylene glycol such as ethylene glycol or propylene glycol, may be added at the time of the polymerization. In this case, the amount of addition is preferably from 0.1 to 10 wt %, based on water of the aqueous dispersion. More preferably, it is from 1 to 5 wt %. If the amount of addition is smaller than this, the gas absorbing effect tends to be small, and if it is too large, the content of a volatile organic compound tends to be large, whereby the environment will be adversely affected.

Further, in the aqueous dispersion having the above-mentioned fluorocopolymer dispersed therein, a radical polymerizable monomer comprising, as the main component, a monomer of an alkyl (meth)acrylate (hereinafter referred to also as a (meth)acrylate), can be subjected to emulsion polymerization. Such emulsion polymerization of a radical polymerizable monomer comprising, as the main component, a monomer of a (meth)acrylate, in the aqueous dispersion having the fluorocopolymer dispersed therein, is one which should be referred to as a post reaction against the dispersed fluorocopolymer or so-called seed polymerization using it as seed particles. In the process of the emulsion polymerization, some mutual actions take place such as penetration of the radical polymerizable monomer comprising, as the main component, a monomer of a (meth)acrylate, into the fluorocopolymer and swelling, and as a result, as the aqueous dispersion of the finally obtainable fluorocopolymer, it is expected to obtain one having the fluorocopolymer and the copolymer comprising, as the main component, a monomer of a (meth)acrylate, mutually more uniformly dispersed as compared with one obtained by preparing the two dispersions separately and then mixing them.

By subjecting the radical polymerizable monomer comprising, as the main component, a monomer of a (meth) acrylate, to seed polymerization, it is possible to improve the mechanical stability, the chemical stability, the film-forming properties, the pigment dispersibility and the processability, while maintaining the characteristics such as the weather resistance of the fluorocopolymer.

Here, the (meth)acrylate is preferably one wherein the carbon number of the alkyl group is from 1 to 18, and for example, methyl (meth)acrylate, ethyl (meth)acrylate, propyl (meth)acrylate, n-butyl (meth)acrylate, isobutyl (meth) acrylate, t-butyl (meth)acrylate, n-amyl (meth)acrylate, isoamyl (meth)acrylate, n-hexyl (meth)acrylate, isohexyl (meth)acrylate, 2-ethylhexyl (meth)acrylate, or lauryl (meth)acrylate, may, for example, be mentioned. Among them, a (meth)acrylate having a $C_{1-5}$ alkyl group, is particularly preferred.

Further, together with the above-mentioned (meth) acrylate, other monomer copolymerizable therewith may be used within a range of not more than 50 mol %, preferably not more than 30 mol %, based on the above-mentioned (meth)acrylate.

Other monomer copolymerizable with the (meth)acrylate may, for example, be a carboxyl group-containing monomer such as (meth)acrylic acid, maleic acid or crotonic acid; an amide compound such as (meth)acrylamide, N-methyl (meth)acrylamide, N-methylol (meth)acrylamide or N-butoxymethyl (meth)acrylamide; a hydroxyl group-containing monomer such as hydroxyethyl (meth)acrylate, or hydroxypropyl (meth)acrylate; an epoxy group-containing monomer such as glycidyl (meth)acrylate; or a hydrolysable silyl group-containing monomer such as γ-trimethoxysilane (meth)acrylate or γ-triethoxysilane (meth)acrylate.

In a case where the monomer comprising, as the main component, a (meth)acrylate is subjected to emulsion polymerization in an aqueous dispersion of the present invention, it is preferred that from 5 to 200 parts by weight of a radical polymerizable monomer mixture comprising, as the main component, an alkyl (meth)acrylate having a $C_{1-18}$ alkyl group is subjected to emulsion polymerization in the presence of 100 parts by weight of particles of the fluorocopolymer. In a case where together with the (meth)acrylate, other monomer copolymerizable therewith is subjected to emulsion polymerization, it is preferred that from 5 to 200 parts by weight of a mixture comprising an alkyl (meth) acrylate having a $C_{1-18}$ alkyl group and a radical polymerizable other monomer having a functional group selected from a carboxyl group, a hydrolysable silyl group, an epoxy group and a hydroxyl group, is subjected to emulsion polymerization in the presence of 100 parts by weight of particles of the fluorocopolymer. Accordingly, in a case where the above-mentioned so-called seed polymerization is employed, from 5 to 200 parts by weight of a monomer comprising, as the main component, the (meth)acrylate, is charged into a reactor and subjected to emulsion polymerization in the presence of 100 parts by weight of particles of the fluorocopolymer.

The conditions for the emulsion polymerization of the monomer comprising, as the main component, the above (meth)acrylate, may be in accordance with the conditions employed for the emulsion polymerization relating to the above described fluorocopolymer.

By the above method, an aqueous dispersion containing the fluorocopolymer and a copolymer comprising, as the main component, the (meth)acrylate, can be obtained, and the content of the copolymer comprising, as the main component, the (meth)acrylate is from 5 to 200 parts by weight, preferably from 10 to 100 parts by weight, more preferably from 20 to 50 parts by weight, per 100 parts by weight of the fluorocopolymer. The range of the melting point of the composite particles comprising the fluorocopolymer and the copolymer comprising, as the main component, the (meth)acrylate, is preferably from 40 to 150° C., more preferably from 60 to 120° C. If the melting point is too low, the hardness of the coating film tends to be inadequate, and if the melting point is too high, no adequate fluidity can be obtained at the time of heat coating, and the appearance of the coating film tends to be impaired.

To obtain a crosslinkable composition for water-based coating material, firstly, from 5 to 100 parts by weight of a mixture comprising (j) the above-mentioned (meth)acrylate having a $C_{1-18}$ alkyl group and/or other monomer copolymerizable therewith, and (k) a radical polymerizable monomer composed of a carbonyl group-containing monomer, is subjected to emulsion polymerization in the presence of 100 parts by weight of particles of the fluorocopolymer. Then, to the aqueous dispersion thereby obtainable, a hydrazine derivative containing at least two hydrazine residues, is incorporated to obtain a composition for water-based coating material.

The carbonyl group-containing monomer (k) may, for example, be a $C_{4-7}$ vinyl alkyl ketone such as acrolein, diacetone acryloamide, formyl styrol or vinyl ethyl ketone, a (meth)acryloxyalkyl propanol, acetonitrile acrylate, diacetone (meth)acrylate, 2-hydroxypropyl (meth)acrylate-acetyl acetate, or butane diol 1,4-(meth)acrylate-acetyl acetate. Among them, from the viewpoint of weather resistance, 2-hydroxypropyl (meth)acrylate-acetyl acetate, butane diol 1,4-(meth)acrylate-acetyl acetate or vinyl methyl ketone is preferred.

The above-mentioned hydrazine derivative containing at least two hydrazine residues, may, for example, be a $C_{2-10}$ carboxylic acid dihydrazide, such as oxalic acid dihydrazide, malonic acid dihydrazide, succinic acid dihydrazide, glutaric acid dihydrazide, adipic acid dihydrazide, isophthalic acid dihydrazide, sebacic acid dihydrazide, maleic acid dihydrazide, fumaric acid dihydrazide or itaconic acid dihydrazide, or a $C_{2-4}$ dihydrazine such as ethylene-1,2-dihydrazine, propylene-1,3-dihydrazine or butylene-1,4-dihydrazine. Among them, adipic acid dihydrazide or isophthalic acid dihydrazide is particularly preferred.

The hydrazine derivative will react with carbonyl groups in the copolymer to form crosslinking structures, when the above composition for water-based coating material is dried to form a coating film. The ratio of hydrazino groups in the hydrazine derivative to the carbonyl groups in the copolymer, is such that the hydrazino groups are from 0.5 to 1.2 mol per mol of the carbonyl groups. If the hydrazino groups are less than 0.5, the crosslinking reaction tends to be inadequate, whereby the water resistance and the solvent resistance tends to be inadequate. On the other hand, if they exceed 1.2 mol, the residual hydrazine derivative which is not concerned with the reaction tends to be so much that the water resistance tends to deteriorate. A particularly preferred range is from 0.1 to 1.0 mol.

The above-mentioned copolymer comprising, as the main component, the (meth)acrylate or the copolymer obtainable by emulsion polymerization of from 5 to 100 parts by weight of a mixture comprising (j) the (meth)acrylate and other monomer copolymerizable therewith and (k) a radical polymerizable monomer composed of a carbonyl group-containing monomer, is from 5 to 200 parts by weight, preferably from 10 to 100 parts by weight, more preferably from 20 to 50 parts by weight, per 100 parts by weight of the fluorocopolymer. Accordingly, when the above-mentioned so-called seed polymerization is employed, from 5 to 200 parts by weight of a monomer mixture comprising, as the main component, the (meth)acrylic acid, or from 5 to 100 parts by weight of a mixture comprising (j) the (meth) acrylate and other monomer copolymerizable therewith and (k) a radical polymerizable monomer composed of a carbonyl group-containing monomer, is charged into the reactor and subjected to emulsion polymerization in the presence of 100 parts by weight of the fluorocopolymer. Conditions for such an emulsion polymerization may be in accordance with the above described conditions for the emulsion polymerization relating to the fluorocopolymer.

The range of the melting point of the composite particles obtained by emulsion polymerization of the monomer mixture comprising, as the main component, the (meth)acrylate in the presence of the fluorocopolymer, or the composite particles obtainable by emulsion polymerization of from 5 to 100 parts by weight of a mixture comprising (j) the (meth) acrylate and other monomer copolymerizable therewith, and (k) a radical polymerizable monomer composed of a carbonyl group-containing monomer, in the presence of the fluorocopolymer, is required to be from 40 to 150° C., more preferably from 60 to 120° C. If the melting point is too low, the hardness of the coating film tends to be inadequate, and if the melting point is too high, no adequate fluidity will be obtained at the time of heat coating, whereby the appearance of the coating film will be impaired.

Further, the glass transition temperature of the above-mentioned composite particles is preferably within a range of from −20 to +80° C., more preferably from 0 to 70° C. If the glass transition temperature is too low, the coating film tends to be tacky, and if it is too high, the flexibility of the coating film tends to be impaired.

Further, the value Q as an index of the molecular weight of the above-mentioned composite particles is preferably within a range of from 0.1 to 10,000, more preferably from 1 to 1,000, still further preferably from 10 to 500.

If the value Q is less than 0.1, the fluidity of the particles tends to decrease, and the film-forming properties and the smoothness of the coating film tend to deteriorate. If it exceeds 10,000, the mechanical strength of the coating film tends to be impaired.

Further, the average particle size of the above-mentioned composite particles is preferably within a range of from 50 nm to 300 nm, more preferably from 70 to 200 nm. If the particle size is less than 50 nm, the mechanical stability tends to deteriorate, and the film-forming properties also tend to deteriorate. If it exceeds 300 nm, the precipitation stability, the thermal stability, the mechanical stability and the chemical stability tend to be impaired. However, particles having particle sizes outside the above range may be contained if they are less than 10 wt %.

In the present invention, an inorganic/organic silicon compound may be incorporated to the aqueous dispersion of the above-mentioned fluorocopolymer for the purpose of improving flexibility in addition to the film-forming property, the chemical resistance, the weather resistance and the adhesion to the above-mentioned inorganic substrate or organic substrate, when made into a coating material. As such an inorganic silicon compound, a water-soluble silicate so-called water glass or a water dispersible colloidal silica may, for example, be mentioned.

As the water-soluble silicate, for example, a water-soluble silicate represented by the Formula (I):

$$M_2O \cdot XSiO_2 \quad (I)$$

(wherein M is an alkali metal, or $-N(CH_2CH_2OH)_4$, $-N(CH_2CH_2OH)_4$, $-N(CH_2CH_2OH)_2$ or $-C(NH_2)_2NH$, and X is from 0.5 to 5) may be mentioned. Such a water-soluble silicate may have or may not have water of crystallization.

More specifically, the aqueous solution of the water-soluble silicate of the Formula (I) may be an aqueous solution of e.g. an alkali metal silicate composed of silicic acid and an alkali metal belonging to Group IA of the Periodic Table, a tertiary ammonium silicate composed of silicic acid and a tertiary ammonium, a quaternary ammonium silicate composed of silicic acid and a quaternary ammonium, or a guanidine silicate composed of silicic acid and guanidine. The alkali metal silicate may, for example, be sodium silicate, potassium silicate, lithium silicate or cesium silicate; the tertiary ammonium silicate may, for example, be triethanolamine silicate; and the quaternary ammonium silicate may, for example, be tetramethanol ammonium silicate or tetraethanol ammonium silicate.

Further, a modified water-soluble silicate obtainable by reacting one or more of fluorides of e.g. calcium, magnesium, zinc and zirconium, with such a water-soluble silicate, or a modified water-soluble silicate obtainable by reacting one or more of oxides or hydroxides of a metal belonging to Group 2A of the Periodic Table, or zinc, zirconium, vanadium or cesium, with the above-mentioned water-soluble silicate, may be used alone or in combination.

Among such water-soluble silicates, an alkali metal silicate such as lithium silicate or sodium silicate is preferably employed. Particularly, in the case of lithium silicate, one wherein the molar ratio of $SiO_2/Li_2O$ is from 3.0 to 25.0, preferably from 3.0 to 4.8, is preferably employed. If the molar ratio is smaller than 3.0, the water resistance of the obtainable coating film is likely to be low, and if it exceeds 25.0, the operation efficiency for the preparation of the coating composition and the storage stability are likely to be low. In the case of sodium silicate, the weight ratio of $SiO_2/Na_2O$ is preferably within a range of from 1.5 to 4.0, more preferably within a range of from 3.0 to 4.0. If the molar ratio is smaller than 1.5, the water resistance of the obtainable coating film is likely to be low, and if it exceeds 4.0, the operation efficiency during the preparation of the coating composition and the storage stability are likely to be low. Further, from the viewpoint of the transparency of the coating film, lithium silicate is preferred.

The colloidal silica may, for example, be produced by removal of sodium (ion exchange method, acid decomposition method or peptization method) of water glass, and the primary particle size is from 4 to 150 nm, preferably from 5 to 50 nm. Such is usually supplied in the form of an aqueous dispersion, and can be used as it is.

The above-mentioned colloidal silica may be employed in a state where the aqueous dispersion is an acidic side or a basic side. As a acidic side colloidal silica, a non-stabilized silica (pH 2 to 4) commercially available by a trade name Snowtex-O or Snowtex-OL (manufactured by Nissan Chemical Industries, Ltd.) can be used. On the other hand, as a basic side colloidal silica, a silica (pH 8.4 to 10) stabilized by an addition of a very small amount of alkali metal ions, aluminum ions, ammonium ions or amine, is available, and for example, those commercially available by trade names Snowtex 20, Snowtex C and Snowtex N (manufactured by Nissan Chemical Industries, Ltd.), trade name Rudox HS-40, HS-30, LS, SM-30, TM, AS and AM (manufactured by DuPont, U.S.A.), trade name Nalcoak (manufactured by Nalco Chemical Company, U.S.A.), and trade name Mitten (manufactured by Monsant Chemical Company, U.S.A.), may be mentioned. If the pH is from 6 to 8, not only the stability of the colloidal silica, but when made into a coating material, the stability of the coating material tends to deteriorate, and coagulation and gelation tend to result.

Further, the organic silicon compound may be a monomer represented by the general formula (II):

$$R^1_a Si (OR^2)_{4-a} \qquad (II)$$

(wherein $R^1$ is a non-hydrolysable group or a hydrogen atom, R2 is an alkyl group, an aryl group, an alkenyl group or a hydrogen atom, and a is 0, 1 or 2).

In the above general formula (II), the non-hydrolysable group may, for example, be an alkyl group such as methyl, ethyl or propyl, an aryl group such as a phenyl group, a tolyl group or a mesityl group, an alkenyl group such as a vinyl group or an allyl group, a haloalkyl group such as a γ-chloropropyl group, an aminoalkyl group such as a γ-aminopropyl group or a γ-(2-aminoethyl)aminopropyl group, a γ-glycidoxy propyl group, an epoxy alkyl group such as a β-(3,4-epoxycyclohexyl)ethyl group, a γ-mercaptoalkyl group, a methacryloyloxyalkyl group such as a γ-methacryloyloxypropyl group, or a hydroxyalkyl group such as a γ-hydroxypropyl group. Among these substituents, preferred is an alkyl group having a carbon number of not more than 8, more preferably a carbon number of not more than 4 and one having a substituent added thereto such as an aminoalkyl group, an epoxy alkyl group, a methacryloyloxyalkyl group, a hydroxyalkyl group, and a phenyl group as one of aryl groups, and a $C_{2-3}$ alkenyl group, from such a viewpoint that if the carbon number of the substituent is large, the reactivity tends to be low. Further, with respect to the alkyl group, the aryl group and the alkenyl group for $R^2$, the same as $R^1$ applies, and particularly preferred is an alkyl group having a carbon number of not more than 4 from such a viewpoint that if the carbon number of the substituent is large, the reactivity tends to be low.

Specific examples for the above general formula (II) include tetramethoxysilane, tetraethoxysilane, tetrapropoxysilane, methyltrimethoxysilane, methyltriethoxysilane, dimethyldimethoxysilane, vinyl triethoxysilane, phenyltrimethoxysilane, phenyltriethoxysilane, γ-chloropropyltrimethoxysilane, γ-aminopropyltrimethoxysilane, N-(β-aminoethyl)aminopropyltrimethoxysilane, γ-glycidoxypropyltrimethoxysilane, β-(3,4-epoxycyclohexyl)ethyltrimethoxysilane, γ-mercaptopropyltrimethoxysilane, γ-methacryloyloxypropyltrimethoxysilane and γ-hydroxypropyltrimethoxysilane. From the viewpoint of the reactivity, the film-forming property and the flexibility, methyltrimethoxysilane, phenyltrimethoxysilane or γ-methacryloyloxypropyltrimethoxysilane is, for example, preferred.

In the composition for water-based coating material of the present invention, the ratio of the inorganic/organic silicon compound to the fluorocopolymer is such that the inorganic/organic silicon compound is within a range of from 0.1 to 100 parts by weight, more preferably from 1 to 50 parts by weight, per 100 parts by weight of the fluorocopolymer. If the ratio of the inorganic/organic silicon compound is smaller than 0.1, the stain deposition resistance of the surface of the obtainable coating film tends to be inadequate, and if it exceeds 100, defects such as cracks are likely to form in the coating film due to inadequate flexibility at the time of forming a coating film or as the time passes.

The aqueous dispersion of the present invention may be useful as a water-based coating material as it is. However, additives which are usually added to water-based coating materials, such as a coloring agent, a plasticizer, an ultraviolet absorber, a leveling agent, a defoaming agent, a pigment dispersing agent, a thickener, a cissing-preventive agent, an anti-skinning agent and a curing agent, may be incorporated as the case requires. Further, a metallic pigment such as an aluminum paste may be used. As the coloring agent, a dye, an organic pigment or an inorganic pigment may, for example, be mentioned. As the plasticizer, a conventional one, for example, a low molecular weight plasticizer such as dioctylphthalate, or a high molecular weight plasticizer such as a vinyl polymer plasticizer or a polyester type plasticizer, may, for example, be mentioned. As a film-forming co-agent, a polyhydric alcohol monoether such as dipropylene glycol-n-butyl ether, ethylene glycol monoethyl ether, ethylene glycol monobutyl ether or diethylene glycol monobutyl ether, or an organic acid ester, may, for example, be used. Further, as the curing agent, a block isocyanate such as a hexamethylene diisocyanate trimmer, or a melamine resin such as methylated melamine or methylol modified melamine, may, for example, be used.

Further, in order to improve the stability of the aqueous dispersion, a pH controlling agent may be added.

The present invention will be described in detail with reference to the following Preparation Examples and Working Examples. However, the present invention is by no means restricted by such Examples. Further, in the following Examples, parts means parts by weight unless otherwise specified.

PREPARATION EXAMPLE 1

Into a stainless steel autoclave having an internal capacity of 2.5 l and equipped with a stirrer, 1,100 g of deionized water, 4.75 g of a fluorine type anionic emulsifier (FC-143, manufactured by Sumitomo 3M Company), 2.2 g of a nonionic emulsifier (N-1110, manufactured by Nippon Nyukazai K.K.) and 46.6 g of t-butanol were charged, and deaeration by a vacuum pump and pressurizing with a nitrogen gas were repeated to remove air. Then, 72 g of tetrafluoroethylene, 1.1 g of propylene and 1.4 g of ethylene were introduced into the autoclave.

When the internal temperature of the autoclave reached 70° C., the pressure was 13.4 kg/cm$^2$G. Then, 2 cc of an aqueous solution containing 25% of ammonium persulfate was added to initiate the reaction. While maintaining the pressure by pressurizing as the pressure decreased, 430.5 g of a gas mixture comprising 50 mol % of tetrafluoroethylene, 25 mol % of ethylene and 25 mol % of propylene, was continuously added to continue the polymerization reaction.

Further, during the progress of the reaction, 30 cc of an aqueous solution containing 25% of ammonium persulfate was continuously added. 8 hours later, supply of the gas mixture was stopped, and the autoclave was cooled with water to room temperature, whereupon an unreacted monomer was purged, and the autoclave was opened to obtain an aqueous dispersion having a solid content concentration of 28.4 wt %. The particle size was 79 nm.

A 20% ammonium chloride aqueous solution was added to the obtained aqueous dispersion for coagulation, followed by filtration with a glass filter, and the contained water was removed under a reduced pressure of 4 mmHg over a period of 5 hours, followed by pulverization by an impact hammer mill to obtain a powder of a fluorocopolymer. As a result of the analysis of the composition by $^{13}$C-NMR, this copolymer was found to comprise 52 mol % of polymer units based on tetrafluoroethylene, 20 mol % of polymer units based on ethylene, and 28 mol % of polymer units based on propylene. Further, the melting point was 96.2° C., the glass transition temperature was 16.7° C., and the value Q at 140° C. was 6.67.

PREPARATION EXAMPLE 2

Into a stainless steel autoclave having an internal capacity of 1.3 l and equipped with a stirrer, 675 g of deionized water, 6.8 g of an anionic emulsifier (sodium lauryl sulfate, manufactured by Nikko Chemical K.K.), 20.3 parts of a nonionic emulsifier (N-1120, manufactured by Nippon Nyukazai K.K.) and 33 g of t-butanol, were charged, and deaeration by a vacuum pump and pressurizing with a nitrogen gas were repeated to remove air. Then, 90 g of tetrafluoroethylene, 4.7 g of propylene and 3.2 g of ethylene were introduced into the autoclave.

When the internal temperature of the autoclave reached 65° C., the pressure was 2.68 MPa. Then, 5.8 cc of an aqueous solution containing 20% of ammonium persulfate was added to initiate the reaction. While maintaining the pressure by pressuring as the pressure decreased, 430 g of a gas mixture comprising 56 mol % of tetrafluoroethylene, 32 mol % of propylene and 12 mol % of ethylene, was continuously added to continue the reaction.

Further, during the progress of the reaction, 12 cc of an aqueous solution containing 20% of ammonium persulfate was continuously added. 8 hours later, supply of the gas mixture was stopped, and the autoclave was cooled with water to room temperature, whereupon an unreacted monomer was purged, and the autoclave was opened to obtain an aqueous dispersion having a solid content concentration of 39.4%. The particle size was 82 nm.

The obtained aqueous dispersion was precipitated by a centrifugal separator, and the polymer was collected by a glass filter, and the contained water was removed under a reduced pressure of 4 mmHg over a period of 5 hours, followed by pulverization by an impact hammer mill, to obtain a powder of a fluorocopolymer. From the results of the analysis of the composition by $^{13}$C-NMR, this copolymer was found to comprise 52 mol % of polymer units based on tetrafluoroethylene, 38 mol % of polymer units based on propylene and 10 mol % of polymer units based on ethylene. The melting point was 49.2° C., and the glass transition temperature was 6.7° C. Further, the value Q was 830.

PREPARATION EXAMPLE 3

Into a stainless steel autoclave having an internal capacity of 2.5 l and equipped with a stirrer, 1,010 g of deionized water, 2.2 g of potassium carbonate ($K_2CO_3$), 32.2 g of a nonionic emulsifier (N-1110, manufactured by Nippon Nyukazai K.K.), 1.1 g of an anionic emulsifier (sodium lauryl sulfate), 46.6 g of t-butanol and 19.8 g of EOVE-1, were charged, and deaeration by a vacuum pump and pressurizing with a nitrogen gas were repeated to remove air. Then, 188 g of tetrafluoroethylene, 8 g of ethylene, 3.8 g of propylene and 5.1 g of isobutylene were introduced into the autoclave.

When the internal temperature of the autoclave reached 70° C., the pressure was 15.4 kg/cm$^2$G. Then, 2 cc of an aqueous solution containing 25% of ammonium persulfate was added to initiate the reaction. While maintaining the pressure by pressuring as the pressure decreased, 530 g of a gas mixture comprising 50 mol % of tetrafluoroethylene, 30 mol % of ethylene, 10 mol % of propylene and 10 mol % of isobutylene, was continuously added to continue the reaction.

Further, during the progress of the reaction, 30 cc of an aqueous solution containing 25% of ammonium persulfate was continuously added. 10 hours later, supply of the gas mixture was stopped, and the autoclave was cooled with water to room temperature, whereupon an unreacted monomer was purged, and the autoclave was opened to obtain an aqueous dispersion having a solid content concentration of 34.5 wt %. The particle size was 76 nm. The obtained aqueous dispersion was precipitated by a centrifugal separator, followed by filtration with a glass filter, and the contained water was removed under a reduced pressure of 4 mmHg over a period of 5 hours, followed by pulverization by an impact hammer mill, to obtain a powder of a fluorocopolymer. From the results of the analysis of the composition by $^{13}$C-NMR, this copolymer was found to comprise 54 mol % of polymer units based on tetrafluoroethylene, 20 mol % of polymer units based on ethylene, 16 mol % of polymer units based on propylene and 9.5% of polymer units based on isobutylene. Further, the melting point was 102.3° C., the glass transition temperature was 42.4° C., and the value Q at 140° C. was 1.3.

PREPARATION EXAMPLE 4

Into a stainless steel autoclave having an internal capacity of 1.3 l and equipped with a stirrer, 810 g of deionized water, 8.1 g of a fluorine type anionic emulsifier (FC-143, manufactured by Sumitomo 3M Company), 2.4 g of a nonionic emulsifier (N-1120, manufactured by Nippon Nyukazai K.K.), 14.3 g of 4-hydroxybutyl vinyl ether (hereinafter referred to as HBVE), 16.2 g of EOVE-1 and 40 g of t-butanol were charged, and deaeration by a vacuum pump and pressurizing with a nitrogen gas, were repeated to remove air. Then, 80 g of tetrafluoroethylene, 2.1 g of propylene and 3.3 g of ethylene were introduced into the autoclave.

When the internal temperature of the autoclave reached 65° C., the pressure was 2.34 MPa. Then, 6 cc of an aqueous solution containing 20% of ammonium persulfate was added to initiate the reaction. While maintaining the pressure by pressurizing as the pressure decreased, 430 g of a gas mixture comprising 53 mol % of tetrafluoroethylene, 27 mol % of propylene and 20 mol % of ethylene, was continuously added to continue the reaction.

Further, during the progress of the reaction, 12 cc of an aqueous solution containing 20% of ammonium persulfate was continuously added. 18 hours later, supply of the gas mixture was stopped, and the autoclave was cooled with water to room temperature, whereupon an unreacted monomer was purged, and the autoclave was opened to obtain an aqueous dispersion having a solid content concentration of 37.1%. The particle size was 116 nm.

The obtained aqueous dispersion was precipitated by a centrifugal separator, and the polymer was subjected to filtration with a glass filter, and the contained water was removed under a reduce pressure of 4 mmHg over a period of 5 hours, followed by pulverization by an impact hammer mill to obtain a powder of a fluorocopolymer. From the results of the analysis of the composition by $^{13}$C-NMR, this copolymer was found to comprise 53 mol % of polymer units based on tetrafluoroethylene, 27 mol % of polymer units based on propylene, 17.5 mol % of polymer units based on ethylene, 2 mol % of HBVE and 0.5 mol % of EOVE-1. The melting point was 89.8° C., and the glass transition temperature was 16.6° C. Further, the value Q at 140° C. was 25.

PREPARATION EXAMPLE 5

Into a stainless steel autoclave having an internal capacity of 1.3 l and equipped with a stirrer, 90 parts of the aqueous dispersion of the fluorocopolymer obtained in Preparation Example 2, 616 parts of deionized water, 3.4 parts of potassium carbonate (K$_2$CO$_3$), 20.4 parts of a nonionic emulsifier (N-1120, manufactured by Nippon Nyukazai K.K.), 6.8 parts of an anionic emulsifier (sodium lauryl sulfate), and 33 g of t-butanol, were charged, and deaeration by a vacuum pump and pressurizing with a nitrogen gas, were repeated to remove air. Then, 83 g of tetrafluoroethylene, 4.4 g of propylene and 2.9 g of ethylene were introduced into the autoclave.

When the internal temperature of the autoclave reached 65° C., the pressure was 2.62 MPa. Then, 2 cc of an aqueous solution containing 15% of ammonium persulfate was added to initiate the reaction. While maintaining the pressure as the pressure decreased, 410 g of a gas mixture comprising 52 mol % of tetrafluoroethylene, 38 mol % of propylene and 10 mol % of ethylene, was continuously added to continue the reaction.

Further, during the progress of the reaction, 30 cc of an aqueous solution containing 15% of ammonium persulfate was continuously added. 18 hours later, supply of the gas mixture was stopped, and the autoclave was cooled with water to room temperature, whereupon an unreacted monomer was purged, and the autoclave was opened to obtain an emulsion having a concentration of 34.5%. The particle size was 106 nm. The obtained emulsion was precipitated by a centrifugal separator, and the polymer was subjected to filtration with a glass filter, and the contained water was removed under a reduced pressure of 4 mmHg over a period of 5 hours, followed by pulverization by an impact hammer mill, to obtain a powder of a fluorocopolymer. From the results of the analysis of the composition by $^{13}$C-NNR, this copolymer was found to comprise 52 mol % of polymer units based on tetrafluoroethylene, 38 mol % of polymer units based on propylene, and 10 mol % of polymerlunits based on ethylene. The melting point of this copolymer was 52.3° C. and the glass transition temperature was 6.800. Further, the value Q was 580.

PREPARATION EXAMPLE 6

An aqueous dispersion of a fluorocopolymer was obtained in accordance with the method as disclosed in Preparation Examples 1 to 5 except that the monomer composition to be used for emulsion polymerization was changed as identified in Table 1.

PREPARATION EXAMPLE 7

Into a glass flask having an internal capacity of 200 ml and equipped with a thermometer, a stirrer and a reflux condenser, 70 g of an aqueous dispersion obtained by emulsion polymerization in the same mannlr as in Example 1 except that the monomer composition had proportions as identified in Table 2, was charged (the amount of the fluorocopolymer in the dispersion was 20 g), and heated to 80° C. When the temperature reached 80° C., an aqueous dispersion prepared by emulsifying 10 g of methyl methacrylate, 1.2 g of isobutyl methacrylate, 0.04 g of a nonionic emulsifier (N-1110, manufactured by Nippon Nyukazai K.K.), and 0.02 g of an anionic emulsifier (sodium lauryl sulfate) with a 1 wt % aqueous solution, was dropwise added over a period of one hour. Immediately thereafter, 1 ml of an aqueous solution containing 2 wt % of ammonium persulfalte was added to initiate a reaction. Upon expiration of 3 hours of the reaction, the internal temperature off the flask was raised to 90° C., and the reaction was continued for further one hour to complete the pollymerization, to obtain an aqueous dispersion having a solid content concentration of 40.8 wt % wherein the fluororesin and the methacrylate polymer were 2:1 (weight ratio). The results are shown in Table 2.

PREPARATION EXAMPLES 8 to 26

The fluorine-containing aquelous dispersions were obtained in accordance with the method as disclosed in Preparation Examples 1 to 6 except that the monomer composition to be used for the/emulsion polymerization was changed as shown in Table: 2 to 5.

TABLE 1

| Monomers (mol %) | | Ex. 1 | Ex. 2 | Ex. 3 | Ex. 4 | Ex. 5 | Ex. 6 |
|---|---|---|---|---|---|---|---|
| a | Tetrafluoroethylene | 90/52 | 80/52 | 78.8/54 | 80/53 | 80/52 | 80/51 |
| b | Propylene | 3.5/28 | 10/38 | 3.8/16 | 5/27 | 10/38 | 5.0/21 |
| c | Ethylene | 6.5/20 | 10/10 | 12.0/20 | 12/17.5 | 10/10 | 8.5/16 |
| d | Isobutylene | | | 3.8/9.5 | | 9.5/18 | 6.5/11.5 |
| e | HBVE | | | | 12.3/2 | | |
| f | EOVE-1 | | | 1.6/0.5 | 3.1/0.5 | | |
| g | EOVE-2 | | | | | | 0.5/0.5 |
| Melting point (° C.) | | 96.2 | 49.2 | 102.3 | 89.8 | 52.3 | 49.2 |
| Glass transition temperature (° C.) | | 16.7 | 6.7 | 42.4 | 16.6 | 6.8 | 6.7 |
| Value Q | | 6.67 | 830 | 1.3 | 25 | 580 | 250 |
| Particle size (nm) | | 79 | 82 | 76 | 116 | 106 | 112 |

TABLE 2

| Monomers (mol %) | | Ex. 7 | Ex. 8 | Ex. 9 | Ex. 10 | Ex. 11 | Ex. 12 |
|---|---|---|---|---|---|---|---|
| a | Tetrafluoroethylene | 90/52 | 80/52 | 80/54 | 83/53 | 80/53 | 80/51 |
| b | Propylene | 3.5/28 | 10/38 | 3.9/16 | 5/27 | 2.0/8.2 | 5.0/21 |
| c | Ethylene | 6.5/20 | 10/10 | 12.2/20 | 12/20 | 8.5/19 | 8.5/16 |
| d | Isobutylene | | | 3.9/9.5 | | 9.5/18 | 6.5/11.5 |
| e | HBVE | | | | | 2/1.8 | |
| f | EOVE-1 | | | 0.5/0.5 | | | |
| g | EOVE-2 | | | | | | 0.5/0.5 |
| Melting point (° C.) | | 96.2 | 49.2 | 102.3 | 89.8 | 118.0 | 49.2 |
| Glass transition temperature (° C.) | | 16.7 | 6.7 | 42.4 | 16.6 | 53.3 | 6.7 |
| Value Q | | 25 | 1.2 | 650 | 480 | 105 | 0.9 |
| Particle size (nm) | | 78 | 69 | 92 | 103 | 112 | 101 |
| Acrylic monomers (wt %) | Methyl methacrylate | 90 | 90 | 90 | 90 | 90 | |
| | Isobutyl methacrylate | 10 | 10 | 10 | 10 | 10 | |
| | t-Butyl methacrylate | | | | | | 100 |
| Melting point of the composite (° C.) | | 73 | 52 | 80 | 64.3 | 97.8 | — |
| Glass transition temperature of the composite (° C.) | | 34 | 26 | 62.3 | 23.4 | 65.8 | 13.4 |
| Value Q of the composite | | 150 | 68 | 2300 | 1200 | 890 | 3.5 |
| Particle size of the composite (nm) | | 98 | 87 | 112 | 123 | 135 | 120 |

TABLE 3

| Monomers (mol %) | | Ex. 13 | Ex. 14 | Ex. 15 |
|---|---|---|---|---|
| a | Tetrafluoroethylene | 90/52 | 80/52 | 80/54 |
| b | Propylene | 3.5/28 | 10/38 | 3.9/16 |
| c | Ethylene | 6.5/20 | 10/10 | 12.2/20 |
| d | Isobutylene | | | 3.9/9.5 |
| e | HBVE | | | |
| f | EOVE-1 | | | 0.5/0.5 |
| g | EOVE-2 | | | |
| Melting point (° C.) | | 96.2 | 49.2 | 102.3 |
| Glass transition temperature (° C.) | | 16.7 | 6.7 | 60.2 |
| Value Q | | 12 | 4.2 | 1028 |
| Particle size (nm) | | 96 | 89 | 160 |
| Acrylic monomers (wt %) | Methyl methacrylate | | | 90 |
| | Isobutyl methacrylate | 95 | 90 | 5 |
| | Methacrylic acid | 5 | | |
| | 2-Hydroxyethyl methacrylate | | 10 | |
| | γ-Trimethoxysilane methacrylate | | | 5 |
| Melting point of the composite (° C.) | | — | 49.2 | 102.3 |
| Glass transition temperature of the composite (° C.) | | 19.2 | 16.7 | 42.2 |
| Value Q of the composite | | 239 | 494 | 1670 |
| Particle size of the composite (nm) | | 118 | 125 | 186 |

TABLE 4

| Monomers (mol %) | | Ex. 16 | Ex. 17 | Ex. 18 | Ex. 19 | Ex. 20 | Ex. 21 |
|---|---|---|---|---|---|---|---|
| a | Tetrafluoroethylene | 90/52 | 80/52 | 80/54 | 83/53 | 80/53 | 80/51 |
| b | Propylene | 3.5/28 | 10/38 | 3.9/16 | 5/27 | 2.0/8.2 | 5.0/21 |
| c | Ethylene | 6.5/20 | 10/10 | 12.2/20 | 12/20 | 8.5/19 | 8.5/16 |
| d | Isobutylene | | | 3.9/9.5 | | 9.5/18 | 6.5/11.5 |
| e | HBVE | | | | | 2/1.8 | |
| f | EOVE-1 | | | 0.5/0.5 | | | |
| g | EOVE-2 | | | | | | 0.5/0.5 |
| Melting point (° C.) | | 96.2 | 49.2 | 102.3 | 89.8 | 118.0 | 49.2 |
| Glass transition temperature (° C) | | 16.7 | 6.7 | 42.4 | 16.6 | 53.3 | 6.7 |
| Value Q | | 25 | 1.2 | 650 | 480 | 105 | 0.9 |
| Particle size (nm) | | 78 | 69 | 92 | 103 | 112 | 101 |
| Acrylic monomers (wt %) | Methyl methacrylate | | | 80 | 90 | 90 | |
| | Isobutyl methacrylate | | 90 | 10 | | | |
| | t-Butyl methacrylate | 90 | | | | | 90 |
| | Diacetone acrylamide | 10 | | 10 | 10 | 10 | |
| | Vinyl methyl ketone | | 10 | | | | 10 |
| Melting point of the composite (° C.) | | 76 | 53 | 83 | 60 | 90 | 49 |
| Glass transition temperature of the composite (° C.) | | 23 | 12 | 68 | 23 | 48 | 8.6 |
| Value Q of the composite | | 450 | 140 | 3400 | 1830 | 850 | 3.4 |
| Particle size of the composite (nm) | | 96 | 98 | 105 | 112 | 135 | 122 |

TABLE 5

| Monomers (mol %) | | Ex. 22 | Ex. 23 | Ex. 24 | Ex. 25 | Ex. 26 |
|---|---|---|---|---|---|---|
| a | Tetrafluoroethylene | 90/52 | 80/52 | 80/54 | 80/52 | 80/51 |
| b | Propylene | 3.5/28 | 10/38 | 3.9/16 | 10/38 | |
| c | Ethylene | 6.5/20 | 10/10 | 12.2/20 | 10/10 | 20/49 |
| d | Isobutylene | | | 3.9/9.5 | | |
| e | HBVE | | | | | |
| f | EOVE-1 | | | 0.5/0.5 | | |
| g | EOVE-2 | | | | | |
| Melting point (° C.) | | 96.2 | 49.2 | 102.3 | 49.2 | 270 |
| Glass transition temperature (° C.) | | 16.7 | 6.7 | 42.4 | 6.7 | — |
| Value Q | | 25 | 1.2 | 650 | 1.2 | — |
| Particle size (nm) | | 78 | 69 | 92 | 69 | 260 |
| Acrylic monomers (wt %) | Methyl methacrylate | | | 85 | 90 | |
| | Isobutyl methacrylate | 90 | 80 | 5 | 10 | |
| | Diacetone acrylamide | 5 | | 5 | | |
| | Vinyl methyl ketone | | 10 | | | |
| | Methacrylic acid | 5 | | | | |
| | 2-Hydroxyethyl methacrylate | | 10 | | | |
| | γ-Trimethoxysilane methacrylate | | | 5 | | |
| Melting point of the composite (° C.) | | 88 | 56 | 97 | 52 | — |
| Glass transition temperature of the composite (° C.) | | 23 | 12 | 66 | 18 | — |
| Value Q of the composite | | 390 | 8.5 | 830 | 33 | — |
| Particle size of the composite (nm) | | 98 | 87 | 108 | 96 | — |

The abbreviations in Tables 1 to 5 are as follows.
EOVE-1: $CH_2=CHO-C_4H_8-O-(CH_2CH_2O)_nH$ (average molecular weight: 520), TABLE 5-continued

| Monomers (mol %) | Ex. 22 | Ex. 23 | Ex. 24 | Ex. 25 | Ex. 26 |

EOVE-2: $CH_2$=$CHOCH_2$-cyclo-$C_6H_{10}$—$CH_2$—O—$(CH_2CH_2O)_nH$ (average molecular weight: 830)
HBVE: 4-hydroxybutyl vinyl ether Further, the melting point and the glass transition temperature were determined by obtaining a heat generation peak when a sample was heated at a rate of 10° C./min by a differential scanning calorimeter and taking the temperatures at that time as the melting point and the glass transition temperature. When the distribution of the peak of the melting point was broad, the lowest point of the downwardly projected portion was taken as the melting point.

Further, in the compositions for a, b, c, d, e and f, for example, the composition of tetrafluoroethylene being "90/52" indicates that "90" as the numerator represents that the composition in the feed material monomer is 90 mol %, and "52" as the denominator represents that the polymer units based on tetrafluoroethylene in the copolymer are 52 mol %.

EXAMPLES 1 to 15 and COMPARATIVE EXAMPLE 1

A clear coating material was formulated using 71 parts of an aqueous dispersion of the fluorocopolymer obtained as described above (Preparation Examples 1 to 15 and 26), 5.4 parts of a film-forming co-agent, 0.3 part of a thickener, 0.8 part of dispersant, 0.6 part of a defoaming agent and 10.3 parts of deionized water. The film-forming co-agent was Cs-12 (manufactured by Chisso Company); the thickener was Rheobis CR (manufactured by Hoechst Gosei K.K.), the dispersant was Noscospas 44-C (manufactured by Sun-Nopco Company); and the defoaming agent was FS Antifoam 90 (manufactured by Dow Corning Company).

Such a coating material was coated on an aluminum plate by an air spray so that the dried film thickness would be 40 μm and dried at 80° C. for 30 minutes to obtain a test specimen. When the aqueous dispersion of Example 26 was employed, no film was formed, whereby no test specimen was obtained. With respect to such a test specimen, tests on weather resistance, water resistance and stain resistance were carried out.

Evaluation of the weather resistance: After 3,000 hours of the QUV test employing a fluorescent ultraviolet ray weather resistance tester manufactured by Q Panel Company, one having the gloss remarkably deteriorated was identified with symbol X, and one having no substantial deterioration of gloss observed, was identified with symbol ◯.

Evaluation of the water resistance: After immersion in warm water of 60° C. for one week, evaluation was made by the presence or absence of peeling or blistering of the coating film.

The results are shown in Table 6.

TABLE 6

|   | No. | Preparation Example | Film-forming properties | Weather resistance | Water resistance |
|---|---|---|---|---|---|
| Ex. | 1 | 1 | ◯ | ◯ | ◯ |
|     | 2 | 2 | ◯ | ◯ | ◯ |

TABLE 6-continued

|   | No. | Preparation Example | Film-forming properties | Weather resistance | Water resistance |
|---|---|---|---|---|---|
|   | 3  | 3  | ◯ | ◯ | ◯ |
|   | 4  | 4  | ◯ | ◯ | ◯ |
|   | 5  | 5  | ◯ | ◯ | ◯ |
|   | 6  | 6  | ◯ | ◯ | ◯ |
|   | 7  | 7  | ◯ | ◯ | ◯ |
|   | 8  | 8  | ◯ | ◯ | ◯ |
|   | 9  | 9  | ◯ | ◯ | ◯ |
|   | 10 | 10 | ◯ | ◯ | ◯ |
|   | 11 | 11 | ◯ | ◯ | ◯ |
|   | 12 | 12 | ◯ | ◯ | ◯ |
|   | 13 | 13 | ◯ | ◯ | ◯ |
|   | 14 | 14 | ◯ | ◯ | ◯ |
|   | 15 | 15 | ◯ | ◯ | ◯ |
| Comp. Ex. | 1 | 26 | x | — | — |

EXAMPLES 16 to 18

A clear coating material was formulated using 71 parts of the aqueous dispersion of the fluorocopolymer of preparation example 1, 2 or 3, 3.5 parts of lithium silicate ($SiO_2$/$Li_2O$ molar ratio: 4.5; lithium silicate 45, manufacatured by Nissan Chemical), 5.4 parts of a film-forming co-agent, 0.3 part of a thickener, 0.8 part of a dispersant, 0.6 part of a defoaming agent, and 10.3 parts of deionized water, in the amounts as identified in Table 7. Here, the film-forming co-agent was Cs-12 (Chisso Company); the thickener was Rheobis CR (manufactured by Hoechst Gosei K.K.); the dispersant was Noscospas 44-C (manufactured by Sun-Nopco Company); and the defoaming agent was FS Antifoam 90 (manufactured by Dow Corning Company).

EXAMPLES 19 to 21

A clear coating material was formulated using 71 parts of the aqueous dispersion of the fluorocopolymer of Preparation Example 4 to 6, 3.5 parts of colloidal silica (Snowtex C-20, manufactured by Nissan Chemical), 5.4 parts of a film-forming co-agent, 0.3 part of a thickener, 0.8 part of a dispersant, 0.6 part of a defoaming agent and 10.3 parts of deionized water, in the amounts as shown in Table 7. Here, the film-forming co-agent was Cs-12 (manufactured by Chisso Company); the thickener was Rheobis CR (manufactured by Hoechst Gosei K.K.); the dispersant was Noscospas 44-C (manufactured by Sun-Nopco Company); and the defoaming agent was FS ntifoam 90 (manufactured by Dow Corning Company).

EXAMPLES 22 to 24

A clear coating material was formulated using 71 arts of the aqueous dispersion of the fluorocopolymer of reparation Example 7 to 9, 7 parts of ethyl silicate (Ethyl Silicate 40, manufactured by Colcoat Company), 5.4 parts of film-forming co-agent, 0.3 part of a thickener, 0.8 part of a dispersant, 0.6 part of a defoaming agent and 10.3 parts of deionized water, in the amounts as identified in Table 7 or 8. Here, the film-forming co-agent was Cs-12 (manufactured by Chisso Company); the thickener was Rheobis CR (manufactured by Hoechst Gosei K.K.); the dispersant was Noscospas 44-C (manufactured by Sun-Nopco Company); and the defoaming agent was FS Antifoam 90 (manufactured by Dow Corning Company).

COMPARATIVE EXAMPLE 2

A clear coating material was formulated using 71 parts of the aqueous dispersion of the fluorocopolymer of Preparation Example 26, 7 parts of ethyl silicate (Ethyl Silicate 40, manufactured by Colcoat Company), 5.4 parts of a film-forming co-agent, 0.3 part of a thickener, 0.8 part of a dispersant, 0.6 part of a defoaming agent and 10.3 parts of deionized water, in the amounts as shown in Table 8. Here, the film-forming co-agent was Cs-12 (manufactured by Chisso Company); the thickener was Rheobis CR (manufactured by Hoechst Gosei K.K.); the dispersant was Noscospas 44-C (manufactured by Sun-Nopco Company); and the defoaming agent was FS Antifoam 90 (manufactured by Dow Corning Company).

COMPARATIVE EXAMPLE 3

A clear coating material was formulated using 71 parts of the aqueous dispersion of the fluorocopolymer of Preparation Example 1, 5.4 parts of a film-forming co-agent, 0.3 part of a thickener, 0.8 part of a dispersant, 0.6 part of a defoaming agent and 10.3 parts of deionized water, in the amounts as shown in Table 8.

Here, the film-forming co-agent was Cs-12 (manufactured by Chisso Company); the thickener was Rheobis CR (manufactured by Hoechst Gosei K.K.); the dispersant was Noscospas 44-C (manufactured by Sun-Nopco Company); and the defoaming agent was FS Antifoam 90 (manufactured by Dow Corning Company).

Such a coating material was coated on an aluminum plate by an air spray so that the dried film thickness would be 40 μm and dried at 80° C. for 30 minutes to obtain a test specimen. When the aqueous dispersion of Comparative Example 2 was used, no film was formed, and no test specimen was obtained. With respect to such a test specimen, tests on weather resistance, water resistance and stain resistance were carried out.

Stain resistance: Exposure was carried out outdoors at an angle of 45° facing south for one year, whereupon one wherein the color difference after wiping water from the stored plate was less than 2, was identified with symbol ○, one wherein the color difference was from 2 to 5 was identified with symbol Δ, and one wherein the color difference exceeded 5, was identified with symbol X.

Adhesion: A tape peel test was carried out in accordance with JIS K 5400.

TABLE 7

|  | Ex. 16 Pre. Ex. 1 | Ex. 17 Pre. Ex. 2 | Ex. 18 Pre. Ex. 3 | Ex. 19 Pre. Ex. 4 | Ex. 20 Pre. Ex. 5 | Ex. 21 Pre. Ex. 6 | Ex. 22 Pre. Ex. 7 |
|---|---|---|---|---|---|---|---|
| Fluorocopolymer dispersion | 71 | 66 | 68 | 70 | 71 | 68 | 71 |
| Lithium silicate | 3.5 | 3.5 | 3.5 | — | — | — | — |
| Colloidal silica | — | — | — | 3.5 | 3.5 | 3.5 | — |
| Ethyl silicate | — | — | — | — | — | — | 7 |
| Film-forming co-agent | 7 | 7 | 7 | 7 | 7 | 7 | 7 |
| Thickener | 5.4 | 5.4 | 5.4 | 5.4 | 5.4 | 5.4 | 5.4 |
| Dispersant | 0.3 | 0.3 | 0.3 | 0.3 | 0.3 | 0.3 | 0.3 |
| Defoaming agent | 0.8 | 0.8 | 0.8 | 0.8 | 0.8 | 0.8 | 0.8 |
| Deionized water | 10.3 | 15.4 | 13.3 | 11.8 | 10.8 | 13.3 | 10.8 |

TABLE 8

|  | Ex. 23 Pre. Ex. 8 | Ex. 24 Pre. Ex. 9 | Comp. Ex. 2 Pre. Ex. 26 | Comp. Ex. 3 Pre. Ex. 1 |
|---|---|---|---|---|
| Fluorocopolymer dispersion | 71 | 66 | 68 | 71 |
| Lithium silicate | — | — | — | — |
| Colloidal silica | — | — | 3.5 | — |
| Ethyl silicate | 7 | 7 | — | — |
| Film-forming co-agent | 7 | 7 | 7 | 7 |
| Thickener | 5.4 | 5.4 | 5.4 | 5.4 |
| Dispersant | 0.3 | 0.3 | 0.3 | 0.3 |
| Defoaming agent | 0.8 | 0.8 | 0.8 | 0.8 |
| Deionized water | 10.3 | 15.4 | 13.3 | 10.8 |

The results are shown in Table 9.

TABLE 9

|  | No. | Aqueous dispersion liquid | Film-forming properties | Weather resistance | Water resistance | Stain resistance | Adhesion |
|---|---|---|---|---|---|---|---|
| Ex. | 16 | Pre. Ex. 1 | ○ | ○ | ○ | ○ | 100/100 |
|  | 17 | Pre. Ex. 2 | ○ | ○ | ○ | ○ | 100/100 |
|  | 18 | Pre. Ex. 3 | ○ | ○ | ○ | ○ | 100/100 |
|  | 19 | Pre. Ex. 4 | ○ | ○ | ○ | ○ | 100/100 |
|  | 20 | Pre. Ex. 5 | ○ | ○ | ○ | ○ | 100/100 |
|  | 21 | Pre. Ex. 6 | ○ | ○ | ○ | ○ | 100/100 |
|  | 22 | Pre. Ex. 7 | ○ | ○ | ○ | ○ | 100/100 |
|  | 23 | Pre. Ex. 8 | ○ | ○ | ○ | ○ | 100/100 |
|  | 24 | Pre. Ex. 9 | ○ | ○ | ○ | ○ | 100/100 |
| Comp. | 2 | Pre. Ex. 26 | x | — | — | — | — |
| Ex. | 3 | Pre. Ex. 1 | ○ | ○ | ○ | Δ | 80/100 |

EXAMPLE 25

A clear coating material was formulated using 71 parts of the aqueous dispersion of the fluorocopolymer of Preparation Example 16, 7 parts of ethyl silicate (Ethyl Silicate 40, manufactured by Colcoat Company), 5.4 parts of a film-forming co-agent, 0.3 part of a thickener, 0.8 part of a dispersant, 0.6 part of a defoaming agent, 0.6 part of adipic acid dehydrate, and 10.3 parts of deionized water, in the amounts as shown in Table 2. Here, the film-forming co-agent was Cs-12 (manufactured by Chisso Company); the thickener was Rheobis CR (manufactured by Hoechst Gosei K.K.); the dispersant was Noscospas 44-C (manufactured by Sun-Nopco Company); and the defoaming agent was FS Antifoam 90 (manufactured by Dow Corning Company).

EXAMPLES 26 to 33 and COMPARATIVE EXAMPLES 4 to 5

Fluorine-containing water-based coating compositions were formulated in the same manner as in Example 25 except that the blending proportions were changed as shown in Table 10 or 11.

TABLE 10

|  | Ex. 25 | Ex. 26 | Ex. 27 | Ex. 28 | Ex. 29 | Ex. 30 | Ex. 31 |
|---|---|---|---|---|---|---|---|
|  | Pre. Ex. 16 | Pre. Ex. 17 | Pre. Ex. 18 | Pre. Ex. 19 | Pre. Ex. 20 | Pre. Ex. 21 | Pre. Ex. 22 |
| Fluorocopolymer dispersion | 71 | 66 | 68 | 70 | 71 | 68 | 71 |
| Film-forming co-agent | 7 | 7 | 7 | 7 | 7 | 7 | 7 |
| Thickener | 5.4 | 5.4 | 5.4 | 5.4 | 5.4 | 5.4 | 5.4 |
| Dispersant | 0.3 | 0.3 | 0.3 | 0.3 | 0.3 | 0.3 | 0.3 |
| Defoaming agent | 0.8 | 0.8 | 0.8 | 0.8 | 0.8 | 0.8 | 0.8 |
| Colloidal silica | 3.5 | 3.5 | 3.5 | 3.5 | 3.5 |  |  |
| Ethyl Silicate 40 |  |  |  |  |  | 7 | 7 |
| Adipic acid dihydrazide | 0.6 | 0.6 | 0.6 |  |  | 0.6 | 0.6 |
| Isophthalic acid dihydrazide |  |  |  | 0.6 | 0.6 |  |  |
| Deionized water | 10.8 | 15.4 | 13.3 | 11.8 | 10.8 | 13.3 | 10.8 |

TABLE 11

|  | Ex. 32 Pre. Ex. 23 | Ex. 33 Pre. Ex. 24 | Comp. Ex. 4 Pre. Ex. 25 | Comp. Ex. 5 Pre. Ex. 16 |
|---|---|---|---|---|
| Fluorocopolymer dispersion | 71 | 66 | 68 | 70 |
| Film-forming co-agent | 7 | 7 | 7 | 7 |
| Thickener | 5.4 | 5.4 | 5.4 | 5.4 |
| Dispersant | 0.3 | 0.3 | 0.3 | 0.3 |
| Defoaming agent | 0.8 | 0.8 | 0.8 | 0.8 |
| Colloidal silica |  |  | 3.5 | 3.5 |
| Ethyl Silicate 40 | 7 | 7 |  |  |
| Adipic acid dihydrazide | 0.6 | 0.6 |  | 0.6 |
| Isophthalic acid dihydrazide |  |  |  |  |
| Deionized water | 10.8 | 15.4 | 13.3 | 11.8 |

Such a coating material was coated on an aluminum plate by an air spray so that the dried film thickness would be 40 μm, and dried at 80° C. for 30 minutes to obtain a test specimen. With respect to such a test specimen, tests on weather resistance, water resistance, solvent resistance and stain resistance were carried out.

The results are shown in Table 12.

TABLE 12

|  | No. | Aqueous dispersion liquid | Weather resistance | Water resistance | Solvent resistance | Stain resistance | Adhesion |
|---|---|---|---|---|---|---|---|
| Ex. | 1 | Pre. Ex. 1 | ○ | ○ | ○ | ○ | 100/100 |
|  | 2 | Pre. Ex. 2 | ○ | ○ | ○ | ○ | 100/100 |
|  | 3 | Pre. Ex. 3 | ○ | ○ | ○ | ○ | 100/100 |
|  | 4 | Pre. Ex. 4 | ○ | ○ | ○ | ○ | 100/100 |
|  | 5 | Pre. Ex. 5 | ○ | ○ | ○ | ○ | 100/100 |
|  | 6 | Pre. Ex. 6 | ○ | ○ | ○ | ○ | 100/100 |
|  | 7 | Pre. Ex. 7 | ○ | ○ | ○ | ○ | 100/100 |
|  | 8 | Pre. Ex. 8 | ○ | ○ | ○ | ○ | 100/100 |
|  | 9 | Pre. Ex. 9 | ○ | ○ | ○ | ○ | 100/100 |
| Comp. | 1 | Pre. Ex. 10 | ○ | x | x | ○ | 80/100 |
| Ex. | 2 | Pre. Ex. 1 | ○ | x | x | x | 80/100 |

The aqueous dispersion of the fluorocopolymer of the present invention gives a coating film excellent in weather resistance, stain resistance, water resistance, solvent resistance and adhesion and thus is very useful as a material for weather resistant water-based coating material.

Further, a water-based coating material employing the aqueous dispersion of the present invention is one using a stable aqueous dispersion as the base basically without using an organic solvent, and accordingly, it is applicable to a wide range of applications without restrictions such as solvent regulations. For example, it is particularly useful for weather resistant coating of an exterior inorganic building material such as glass, metal or cement.

What is claimed is:

1. An aqueous dispersion characterized in that a fluorocopolymer which is a copolymer comprising (a) polymer units based on a fluoroolefin, (b) polymer units based on propylene, and (c) polymer units based on ethylene and/or (d) polymer units based on butylene and which has a melting point within a range of from 40 to 150° C., is dispersed in water.

2. An aqueous dispersion characterized in that a fluorocopolymer which is the fluorocopolymer as defined in claim 1 and which has a glass transition temperature within a range of from −20° C. to +80° C., is dispersed in water.

3. An aqueous dispersion characterized in that a fluorocopolymer which is the fluorocopolymer as defined in claim 1 and which has a value Q as an index of its molecular weight within a range of from 0.1 to 10,000, is dispersed in water, provided that the value Q is a value defined by a volume extruded in a unit time ($mm^3$/sec), when, using a flow tester, the fluorocopolymer is filled in a cylinder having an inner diameter of 11.3 mm and then extruded from a nozzle having an inner diameter of 2.1 mm and a length of 8 mm under a load of 7 kg at 140° C.

4. An aqueous dispersion characterized in that a fluorocopolymer which is the fluorocopolymer as defined in claim 1 and which has a content of fluorine atoms within a range of from 20 to 65 wt %, is dispersed in water.

5. An aqueous dispersion characterized in that a fluorocopolymer which is the fluorocopolymer as defined in claim 1 and which has a particle size within a range of from 50 nm to 300 nm, is dispersed in water.

6. An aqueous dispersion obtained by emulsion polymerization, in the presence of 100 parts by weight of particles of the fluorocopolymer as defined in claim 1 of from 100 to 10,000 parts by weight of a mixture of the same combination of monomers as for said particles.

7. An aqueous dispersion characterized in that composite particles obtained by emulsion polymerization of from 5 to 200 parts by weight of a radical polymerizable monomer mixture comprising, as the main component, an alkyl (meth) acrylate having a $C_{1-18}$ alkyl group, in the presence of 100 parts by weight of particles of the fluorocopolymer as defined in claim 1 are dispersed in water.

8. A composition for water-based coating material, comprising the aqueous dispersion of the fluorocopolymer as defined in claim 1 and from 0.1 to 100 parts by weight, per 100 parts by weight of the solid content of the fluorocopolymer, of the solid content of an inorganic and/or organic silicon compound, incorporated to the aqueous dispersion.

9. A composition for water-based coating material, comprising the aqueous dispersion as defined in claim 7 and from 0.1 to 100 parts by weight, per 100 parts by weight of the solid content of the composite particles, of the solid content of an inorganic and/or organic silicon compound, incorporated to the aqueous dispersion.

10. A composition for water-based coating material, comprising the aqueous dispersion as defined in claim 7 and a hydrazine derivative having at least two hydrazine residues, incorporated to the aqueous dispersion.

11. An aqueous dispersion characterized in that a fluorocopolymer which is a copolymer comprising (a) polymer units based on a fluoroolefin, (b) polymer units based on propylene, (c) polymer units based on ethylene and/or (d) polymer units based on butylene, and (e) polymer units based on at least one member selected from a vinyl ester, a vinyl ether, an isopropenyl ether and an allyl ether and which has a melting point within a range of from 40 to 150° C., is dispersed in water.

12. An aqueous dispersion characterized in that a fluorocopolymer which is the fluorocopolymer as defined in claim 11 and which has a glass transition temperature within a range of from −20° C. to +80° C., is dispersed in water.

13. An aqueous dispersion characterized in that a fluorocopolymer which is the fluorocopolymer as defined in claim 11 and which has a value Q as an index of its molecular weight within a range of from 0.1 to 10,000, is dispersed in water, provided that the value Q is a value defined by a volume extruded in a unit time ($mm^3$/sec) when, using a flow tester, the fluorocopolymer is filled in a cylinder having an inner diameter of 11.3 mm and then extruded from a nozzle having an inner diameter of 2.1 mm and a length of 8 mm under a load of 7 kg at 140° C.

14. An aqueous dispersion characterized in that a fluorocopolymer which is the fluorocopolymer as defined in claim 11 and which has a particle size within a range of from 50 nm to 300 nm, is dispersed in water.

15. An aqueous dispersion characterized in that a fluorocopolymer which is the fluorocopolymer as defined in claim 11 and which has a content of fluorine atoms within a range of from 20 to 65 wt %, is dispersed in water.

16. An aqueous dispersion obtained by emulsion polymerization, in the presence of 100 parts by weight of particles of the fluorocopolymer as defined in claim 11, of from 100 to 10,000 parts by weight of a mixture of the same combination of monomers as for said particles.

17. An aqueous dispersion characterized in that composite particles obtained by emulsion polymerization of from 5 to 200 parts by weight of a radical polymerizable monomer mixture comprising, as the main component, an alkyl (meth) acrylate having a $C_{1-18}$ alkyl group, in the presence of 100 parts by weight of particles of the fluorocopolymer as defined in claim 11, are dispersed in water.

18. A composition for water-based coating material, comprising the aqueous dispersion of the fluorocopolymer as defined in claim 11 and from 0.1 to 100 parts by weight, per 100 parts by weight of the solid content of the fluorocopolymer, of the solid content of an inorganic and/or organic silicon compound, incorporated to the aqueous dispersion.

19. A composition for water-based coating material, comprising the aqueous dispersion as defined in claim 17 and from 0.1 to 100 parts by weight, per 100 parts by weight of the solid content of the composite particles, of the solid content of an inorganic and/or organic silicon compound, incorporated to the aqueous dispersion.

20. A composition for water-based coating material, comprising the aqueous dispersion as defined in claim 17 and a hydrazine derivative having at least two hydrazine residues, incorporated to the aqueous dispersion.

21. An aqueous dispersion characterized in that a fluorocopolymer which is a copolymer comprising (a) polymer units based on a fluoroolefin, (b) polymer units based on propylene, (c) polymer units based on ethylene and/or (d) polymer units based on butylene, and (f) polymer units based on a hydrophilic macro monomer represented by the general formula: X-Y-Z (wherein X is a radical polymerizable unsaturated group, Y is a hydrophobic bivalent connecting group, and Z is a hydrophilic group) and which has a melting point within a range of from 40 to 150° C., is dispersed in water.

22. An aqueous dispersion characterized in that a fluorocopolymer which is the fluorocopolymer as defined in claim 21 and which has a glass transition temperature within a range of from −20° C. to +80° C., is dispersed in water.

23. An aqueous dispersion characterized in that a fluorocopolymer which is the fluorocopolymer as defined in claim 21 and which has a value Q as an index of its molecular weight within a range of from 0.1 to 10,000, is dispersed in water, provided that the value Q is a value defined by a volume extruded in a unit time ($mm^3$/sec), when, using a flow tester, the fluorocopolymer is filled in a cylinder having an inner diameter of 11.3 mm and then extruded from a nozzle having an inner diameter of 2.1 mm and a length of 8 mm under a load of 7 kg at 140° C.

24. An aqueous dispersion characterized in that a fluorocopolymer which is the fluorocopolymer as defined in claim 21 and which has a particle size within a range of from 50 nm to 300 nm, is dispersed in water.

25. An aqueous dispersion characterized in that a fluorocopolymer which is the fluorocopolymer as defined in claim 21 and which has a content of fluorine atoms within a range of from 20 to 65 wt %, is dispersed in water.

26. An aqueous dispersion obtained by emulsion polymerization, in the presence of 100 parts by weight of particles of the fluorocopolymer as defined in claim 21, of from 100 to 10,000 parts by weight of a mixture of the same combination of monomers as for said particles.

27. An aqueous dispersion characterized in that composite particles obtained by emulsion polymerization of from 5 to 200 parts by weight of a radical polymerizable monomer mixture comprising, as the main component, an alkyl (meth) acrylate having a $C_{1-18}$ alkyl group, in the presence of 100 parts by weight of particles of the fluorocopolymer as defined in claim 21, are dispersed in water.

28. A composition for water-based coating material, comprising the aqueous dispersion of the fluorocopolymer as defined in claim 21 and from 0.1 to 100 parts by weight, per 100 parts by weight of the solid content of the fluorocopolymer, of the solid content of an inorganic and/or organic silicon compound, incorporated to the aqueous dispersion.

29. A composition for water-based coating material, comprising the aqueous dispersion as defined in claim 27 and from 0.1 to 100 parts by weight, per 100 parts by weight of the solid content of the composite particles, of the solid content of an inorganic and/or organic silicon compound, incorporated to the aqueous dispersion.

30. A composition for water-based coating material, comprising the aqueous dispersion as defined in claim 27 and a hydrazine derivative having at least two hydrazine residues, incorporated to the aqueous dispersion.

31. An aqueous dispersion characterized in that a fluorocopolymer which is a copolymer comprising (a) polymer units based on a fluoroolefin, (b) polymer units based on propylene, (c) polymer units based on ethylene and/or (d) polymer units based on butylene, (e) polymer units of at least one member selected from a vinyl ester, a vinyl ether, an isopropenyl ether and an allyl ether, and (f) polymer units based on a hydrophilic macro monomer represented by the general formula: X-Y-Z wherein X is a radical polymerizable unsaturated group, Y is a hydrophobic bivalent connecting group, and Z is a hydrophilic group and which has a melting point within a range of from 40 to 150° C., is dispersed in water.

32. An aqueous dispersion characterized in that a fluorocopolymer which is the fluorocopolymer as defined in claim 31 and which has a glass transition temperature within a range of from −20° C. to +80° C., is dispersed in water.

33. An aqueous dispersion characterized in that a fluorocopolymer which is the fluorocopolymer as defined in claim 31 and which has a value Q as an index of its molecular weight within a range of from 0.1 to 10,000, is dispersed in water, provided that the value Q is a value defined by a volume extruded in a unit time ($mm^3$/sec), when, using a flow tester, the fluorocopolymer is filled in a cylinder having an inner diameter of 11.3 mm and then extruded from a nozzle having an inner diameter of 2.1 mm and a length of 8 mm under a load of 7 kg at 140° C.

34. An aqueous dispersion characterized in that a fluorocopolymer which is the fluorocopolymer as defined in claim 31 and which has a particle size within a range of from 50 nm to 300 nm, is dispersed in water.

35. An aqueous dispersion characterized in that a fluorocopolymer which is the fluorocopolymer as defined in claim 31 and which has a content of fluorine atoms within a range of from 20 to 65 wt %, is dispersed in water.

36. An aqueous dispersion obtained by emulsion polymerization, in the presence of 100 parts by weight of particles of the fluorocopolymer as defined in claim 31, of from 100 to 10,000 parts by weight of a mixture of the same combination of monomers as for said particles.

37. An aqueous dispersion characterized in that composite particles obtained by emulsion polymerization of from 5 to 200 parts by weight of a radical polymerizable monomer mixture comprising, as the main component, an alkyl (meth)acrylate having a $C_{1-18}$ alkyl group, in the presence of 100 parts by weight of particles of the fluorocopolymer as defined in claim 31, are dispersed in water.

38. A composition for water-based coating material, comprising the aqueous dispersion of the fluorocopolymer as defined in claim 31 and from 0.1 to 100 parts by weight, per 100 parts by weight of the solid content of the fluorocopolymer, of the solid content of an inorganic and/or organic silicon compound, incorporated to the aqueous dispersion.

39. A composition for water-based coating material, comprising the aqueous dispersion as defined in claim 37 and from 0.1 to 100 parts by weight, per 100 parts by weight of the solid content of the composite particles, of the solid content of an inorganic and/or organic silicon compound, incorporated to the aqueous dispersion.

40. A composition for water-based coating material, comprising the aqueous dispersion as defined in claim 37 and a hydrazine derivative having at least two hydrazine residues, incorporated to the aqueous dispersion.

41. A composition for water-based coating material, comprising an aqueous dispersion of a fluorocopolymer obtained by emulsion polymerization of from 5 to 100 parts by weight of a radical polymerizable monomer mixture comprising (j) a monomer comprising, as the main component, an alkyl (meth)acrylate having a $C_{1-18}$ alkyl group and (k) a carbonyl group-containing monomer, in the presence of 100 parts by weight of particles of the fluorocopolymer as defined in claim 1, and a hydrazine derivative containing at least two hydrazine residues, incorporated to the aqueous dispersion.

42. A composition for water-based coating material, comprising an aqueous dispersion of a fluorocopolymer obtained by emulsion polymerization of from 5 to 100 parts by weight of a radical polymerizable monomer mixture comprising (j) a monomer comprising, as the main component, an alkyl (meth)acrylate having a $C_{1-18}$ alkyl group and (k) a carbonyl group-containing monomer, in the presence of 100 parts by weight of particles of the fluorocopolymer as defined in claim 1, and a hydrazine derivative containing at least two hydrazine residues, incorporated to the aqueous dispersion.

43. A composition for water-based coating material, comprising an aqueous dispersion of a fluorocopolymer obtained by emulsion polymerization of from 5 to 100 parts by weight of a radical polymerizable monomer mixture comprising (j) a monomer comprising, as the main component, an alkyl (meth)acrylate having a $C_{1-18}$ alkyl group and (k) a carbonyl group-containing monomer, in the presence of 100 parts by weight of particles of the fluorocopolymer as defined in claim 21, and a hydrazine derivative containing at least two hydrazine residues, incorporated to the aqueous dispersion.

44. A composition for water-based coating material, comprising an aqueous dispersion of a fluorocopolymer obtained by emulsion polymerization of from 5 to 100 parts by weight of a radical polymerizable monomer mixture comprising (j) a monomer comprising, as the main component, an alkyl (meth)acrylate having a $C_{1-18}$ alkyl group and (k) a carbonyl group-containing monomer, in the presence of 100 parts by weight of particles of the fluorocopolymer as defined in claim 31, and a hydrazine derivative containing at least two hydrazine residues, incorporated to the aqueous dispersion.

\* \* \* \* \*